United States Patent
Bayesteh et al.

(10) Patent No.: US 10,499,381 B2
(45) Date of Patent: Dec. 3, 2019

(54) SYSTEMS AND METHODS FOR DISTRIBUTED OPEN-LOOP MULTI-USER CO-OPERATIVE MULTI-POINT (COMP) SCHEDULING AND TRANSMISSION

(71) Applicants: Alireza Bayesteh, Ottawa (CA); Usa Vilaipornsawai, Nepean (CA); Mohammadhadi Baligh, Ottawa (CA); Keyvan Zarifi, Ottawa (CA); Yicheng Lin, Ottawa (CA); Mahmoud Taherzadeh Boroujeni, Ottawa (CA)

(72) Inventors: Alireza Bayesteh, Ottawa (CA); Usa Vilaipornsawai, Nepean (CA); Mohammadhadi Baligh, Ottawa (CA); Keyvan Zarifi, Ottawa (CA); Yicheng Lin, Ottawa (CA); Mahmoud Taherzadeh Boroujeni, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 15/182,007

(22) Filed: Jun. 14, 2016

(65) Prior Publication Data
US 2017/0288827 A1    Oct. 5, 2017

Related U.S. Application Data

(60) Provisional application No. 62/316,914, filed on Apr. 1, 2016.

(51) Int. Cl.
*H04Q 7/00*    (2006.01)
*H04W 72/04*    (2009.01)
(Continued)

(52) U.S. Cl.
CPC ......... *H04W 72/042* (2013.01); *H04B 7/024* (2013.01); *H04B 7/0452* (2013.01);
(Continued)

(58) Field of Classification Search
CPC ........... H04W 72/042; H04W 72/0446; H04W 72/046; H04W 72/1231; H04W 72/0473;
(Continued)

(56) References Cited

U.S. PATENT DOCUMENTS

| | | | |
|---|---|---|---|
| 9,385,792 | B2 | 7/2016 | Seo et al. |
| 9,419,750 | B2 | 8/2016 | Roh et al. |

(Continued)

FOREIGN PATENT DOCUMENTS

| | | |
|---|---|---|
| CN | 102130746 A | 7/2011 |
| CN | 102447524 A | 5/2012 |

(Continued)

OTHER PUBLICATIONS

"5G: A Technology Vision", Huawei Technologies, Co., Ltd., 2013, http://www.huawei.com/5gwhitepaper/, pp. 1-16.
(Continued)

*Primary Examiner* — Chuong T Ho

(57) ABSTRACT

Embodiments are provided to enable distributed open-loop multi-user co-operative multi-point (MU-CoMP) scheduling and transmission. In an embodiment, network nodes schedule data transmissions for UEs among multiple transmission tiers that include a first transmission tier having predetermined modulation and coding and a second transmission tier having adaptive modulation and coding. The first transmission tier and the second transmission tier are in respective time-frequency resources that at least partially overlap. The network nodes transmit the scheduled data transmissions in the transmission tiers according to the scheduling for the UEs. A UE receives CoMP transmissions once it is scheduled for transmission by multiple network nodes.

25 Claims, 14 Drawing Sheets

(51) Int. Cl.
*H04L 1/08* (2006.01)
*H04L 1/18* (2006.01)
*H04L 27/26* (2006.01)
*H04B 7/024* (2017.01)
*H04B 7/0452* (2017.01)
*H04B 7/06* (2006.01)
*H04L 5/00* (2006.01)
*H04W 72/12* (2009.01)
*H04W 52/34* (2009.01)
*H04L 1/00* (2006.01)

(52) U.S. Cl.
CPC ......... *H04B 7/0623* (2013.01); *H04B 7/0632* (2013.01); *H04L 1/08* (2013.01); *H04L 1/1812* (2013.01); *H04L 1/1819* (2013.01); *H04L 1/1861* (2013.01); *H04L 1/1896* (2013.01); *H04L 5/005* (2013.01); *H04L 5/0007* (2013.01); *H04L 5/0035* (2013.01); *H04L 5/0044* (2013.01); *H04L 5/0048* (2013.01); *H04L 5/0078* (2013.01); *H04L 5/0094* (2013.01); *H04L 5/0096* (2013.01); *H04L 27/2601* (2013.01); *H04W 72/046* (2013.01); *H04W 72/0406* (2013.01); *H04W 72/0446* (2013.01); *H04W 72/0453* (2013.01); *H04W 72/0466* (2013.01); *H04W 72/0473* (2013.01); *H04W 72/1231* (2013.01); *H04L 1/0003* (2013.01); *H04L 1/0009* (2013.01); *H04L 5/0014* (2013.01); *H04L 5/0026* (2013.01); *H04L 5/0057* (2013.01); *H04W 52/34* (2013.01)

(58) Field of Classification Search
CPC ............. H04W 52/34; H04W 72/0466; H04W 72/0406; H04W 72/0453; H04B 7/0452; H04B 7/0623; H04B 7/024; H04B 7/0632; H04L 1/1861; H04L 5/0035; H04L 5/005; H04L 5/0048; H04L 27/2601; H04L 1/1812; H04L 1/08
USPC .......................................... 370/329, 330, 331
See application file for complete search history.

(56) References Cited

U.S. PATENT DOCUMENTS

| | | | |
|---|---|---|---|
| 9,935,757 B2 * | 4/2018 | Chung | H04L 1/0003 |
| 10,136,418 B2 | 11/2018 | Roh et al. | |
| 10,334,569 B2 | 6/2019 | Roh et al. | |
| 2007/0265016 A1 | 11/2007 | Kahtava et al. | |
| 2010/0034310 A1 | 2/2010 | Nam et al. | |
| 2010/0195594 A1 | 8/2010 | Seo et al. | |
| 2010/0273492 A1 | 10/2010 | Liu et al. | |
| 2010/0275083 A1 | 10/2010 | Nam et al. | |
| 2010/0278034 A9 | 11/2010 | Laroia et al. | |
| 2010/0322132 A1 | 12/2010 | Ramakrishna et al. | |
| 2011/0085503 A1 | 4/2011 | Nam et al. | |
| 2011/0103324 A1 | 5/2011 | Nam et al. | |
| 2011/0110219 A1 | 5/2011 | Nam et al. | |
| 2011/0110449 A1 | 5/2011 | Ramprashad et al. | |
| 2011/0199985 A1 | 8/2011 | Cai et al. | |
| 2011/0243012 A1 | 10/2011 | Luo et al. | |
| 2011/0268176 A1 | 11/2011 | Jeong et al. | |
| 2012/0034927 A1 | 2/2012 | Papasakellariou et al. | |
| 2012/0057523 A1 | 3/2012 | Ji et al. | |
| 2012/0082101 A1 | 4/2012 | Gaal et al. | |
| 2012/0106442 A1 * | 5/2012 | Xiao | H04W 72/044 370/328 |
| 2012/0236741 A1 | 9/2012 | Xu et al. | |
| 2012/0281556 A1 | 11/2012 | Sayana et al. | |
| 2013/0039162 A1 | 2/2013 | Zhang et al. | |
| 2013/0083719 A1 | 4/2013 | Seo et al. | |
| 2013/0128832 A1 | 5/2013 | Kang et al. | |
| 2013/0165122 A1 | 6/2013 | Tanaka | |
| 2013/0195000 A1 | 8/2013 | Shen et al. | |
| 2013/0231122 A1 | 9/2013 | Vrzic et al. | |
| 2013/0251058 A1 | 9/2013 | Wu et al. | |
| 2013/0315337 A1 | 11/2013 | Dai et al. | |
| 2013/0322376 A1 | 12/2013 | Marinier et al. | |
| 2013/0329823 A1 | 12/2013 | Khojastepour | |
| 2014/0050202 A1 | 2/2014 | Baligh et al. | |
| 2014/0112173 A1 | 4/2014 | Hammarwall et al. | |
| 2014/0126484 A1 | 5/2014 | Chen et al. | |
| 2014/0161071 A1 | 6/2014 | Nam et al. | |
| 2014/0169408 A1 | 6/2014 | Bayesteh et al. | |
| 2014/0192734 A1 | 7/2014 | Ng et al. | |
| 2014/0362701 A1 | 12/2014 | Roh et al. | |
| 2014/0365848 A1 | 12/2014 | Roh et al. | |
| 2014/0369434 A1 | 12/2014 | Taherzadehboroujeni et al. | |
| 2015/0092882 A1 | 4/2015 | Lee et al. | |
| 2015/0244439 A1 | 8/2015 | Nam et al. | |
| 2015/0264666 A1 * | 9/2015 | Yi | H04L 5/001 370/329 |
| 2015/0289257 A1 | 10/2015 | Luo et al. | |
| 2015/0295695 A1 | 10/2015 | Davydov et al. | |
| 2015/0312074 A1 | 10/2015 | Zhu et al. | |
| 2015/0327274 A1 | 11/2015 | Lim et al. | |
| 2016/0028527 A1 | 1/2016 | Nam et al. | |
| 2016/0028528 A1 | 1/2016 | Nam et al. | |
| 2016/0036504 A1 | 2/2016 | Khojastepour et al. | |
| 2016/0080058 A1 * | 3/2016 | Kang | H04B 7/0617 370/329 |
| 2016/0087694 A1 | 3/2016 | Vilaipornsawai et al. | |
| 2016/0234820 A1 | 8/2016 | Mallik et al. | |
| 2016/0278125 A1 * | 9/2016 | Liao | H04W 24/00 |
| 2016/0286549 A1 * | 9/2016 | Abraham | H04W 16/14 |
| 2016/0337149 A1 | 11/2016 | Wu et al. | |
| 2016/0353433 A1 | 12/2016 | Roh et al. | |
| 2017/0006539 A1 | 1/2017 | Kakishima et al. | |
| 2017/0093826 A1 | 3/2017 | Werneyer | |
| 2017/0141886 A1 * | 5/2017 | Chung | H04L 1/0003 |
| 2017/0163533 A1 | 6/2017 | Breiling et al. | |
| 2017/0171786 A1 | 6/2017 | Mochizuki et al. | |
| 2017/0202025 A1 | 7/2017 | Ouchi et al. | |
| 2017/0289984 A1 * | 10/2017 | Baligh | H04L 1/08 |
| 2017/0290046 A1 | 10/2017 | Sun et al. | |
| 2017/0339704 A1 * | 11/2017 | Matsumoto | H04W 16/14 |
| 2017/0359827 A1 * | 12/2017 | Kim | H04W 72/082 |
| 2018/0041988 A1 | 2/2018 | Lee et al. | |
| 2018/0159669 A1 * | 6/2018 | Chung | H04L 1/0003 |
| 2018/0316371 A1 | 11/2018 | Davydov et al. | |
| 2019/0053224 A1 | 2/2019 | Roh et al. | |

FOREIGN PATENT DOCUMENTS

| | | |
|---|---|---|
| CN | 102804897 A | 11/2012 |
| CN | 102918788 A | 2/2013 |
| CN | 103095401 A | 5/2013 |
| CN | 103220069 A | 7/2013 |
| CN | 103503326 A | 1/2014 |
| CN | 103563321 A | 2/2014 |
| CN | 104335514 A | 2/2015 |
| CN | 104486784 A | 4/2015 |
| CN | 104581845 A | 4/2015 |
| CN | 106063151 A | 10/2016 |
| EP | 3297377 A1 | 3/2018 |
| JP | 2015185955 A | 10/2015 |
| JP | 2016506143 A | 2/2016 |
| WO | 2012020457 A1 | 2/2012 |
| WO | 2012051863 A | 4/2012 |
| WO | 2013068835 A2 | 5/2013 |
| WO | 2014090189 A1 | 6/2014 |
| WO | 2014201988 A1 | 12/2014 |

OTHER PUBLICATIONS

Furukawa, Hiroshi et al., "SSDT—Site Selection Diversity Transmission Power Control for CDMA Forward Link", IEEE Journal on Selected Areas in Communications, vol. 18. No. 8, Aug. 2000, pp. 1546-1554.

(56) References Cited

OTHER PUBLICATIONS

Gesbert, David et al., "Multi-Cell MIMO Cooperative Networks: A New Look at Interference", IEEE Journal on Selected Areas in Communications, vol. 28, No. 9, Dec. 2010, pp. 1-29.
Chae, Chan-Byoung et al., "Coordinated Beamforming with Limited Feedback in the MIMO Broadcast Channel", IEEE Journal on Selected Areas in Communications, vol. 26, No. 8, Oct. 2008, pp. 1505-1515.
Hoshyar, Reza et al., "Novel Low-Density Signature for Synchronous CDMA Systems Over AWGN Channel", IEEE Transactions on Signal Processing, vol. 56, No. 4, Apr. 2008, pp. 1616-1626.
Nikopour, Hosein et al., "Sparse Code Multiple Access", IEEE 24th International Symposium on Personal, Indoor and Mobile Radio Communications: Fundamentals and PHY Track, Sep. 2013, pp. 332-336.
Van De Beek, Jaap et al. "Multiple Access with Low-Density Signatures", Global Telecommunications Conference, IEEE GLOBECOM, Nov. 2009, pp. 1-6.
Zhang, Shunqing et al., "Sparse Code Multiple Access: An Energy Efficient Uplink Approach for 5G Wireless Systems", Gobal Communications Conference, IEEE GLOBECOM 2014—Wireless Networking Symposium, Dec. 2014, pp. 4782-4787.
Au, Kelvin et al., "Uplink Contention Based SCMA for 5G Radio Access", Proc. IEEE GLOBECOM 2014, Dec. 2014, pp. 1-6.
3GPP TR 36.814 V9.0.0, 3rd Generation Partnership Project; Technical Specification Group Radio Access Network; Evolved Universal Terrestrial Radio Access (E-UTRA); Further advancements for E-UTRA physical layer aspects (Release 9), 3GPP, Apr. 2013, pp. 1-104.
Taherzadeh, Mahmoud et al., "SCMA Codebook Design", IEEE VTC Fall, Sep. 2014, pp. 1-5.
Zarifi, Keyvan et al,. "Radio Access Virtualization: Cell follows User", IEEE 25th International Symposium on Personal, Indoor and Mobile Radio Communications, Sep. 2014, pp. 1381-1385.
"The Second Phase of LTE-Advanced, LTE-B: 30-fold Capacity Boosting to LTE", Huawei Technologies, Co., Ltd., 2013, http://www.huawei.com/en/industry-insights/huawei-voices/white-papers/hw_259010, pp. 1-20.
Agrawal, Rajeev et al., "Dynamic Point Selection for LTE-Advanced: Algorithms and Performance", IEEE WCNC'14 Track 2 (MAC and Cross-Layer Design), 2014, pp. 1-6.
Karakayali, M. Kemal et al., "Network Coordination for Spectrally Efficient Communications in Cellular Systems", IEEE Transactions on Wireless Communications, vol. 13, No. 4, Aug. 2006, pp. 56-61.
Dahrouj, Hayssam et al., "Coordinated Beamforming for the Multicell Multi-Antenna Wireless System", IEEE Transactions on Wireless Communications, vol. 9, No. 5, May 2010, pp. 1748-1759.
ZTE, RP-151790 "Motivation for study on enhancements for densely deployed small cells in LTE", 3GPP TSG RAN Meeting #70, Dec. 7-10, 2015, pp. 1-8, Sitges, Spain.
ZTE, RP-150612 "Initial Analysis of Ultra Dense Network", 3GPP TSG RAN Meeting #68, Jun. 15-18, 2015, pp. 1-6, Malmö, Sweden.
Zhu, Jianchi, et al, "A Practical Design of Downlink Coordinated Multi-Point Transmission for LTE-Advanced", IEEE 31, Dec. 31, 2010, pp. 1-6, China.
CATT, R1-122043, "On downlink control signaling for CoMP", 3GPP TSG RAN WG1 Meeting #69, May 21-25, 2012, pp. 1-3, Prague, Czech Republic.
Usa Vilaipornsawai et al., "SCMA for Open-Loop Joint Transmission CoMP", Computer Science, dated Apr. 7, 2015, total 5 pages.
Malte Schellmann, "Mobile and wireless communications Enablers for the Twenty-twenty Information Society (METIS)"-Proposed solutions for new radio access Deliverable D2.4, Document Number: ICT-317669-METIS/D2.4, dated Feb. 28, 2015, total 190 pages.
Vilaipornsawai, USA; SCMA for Open-Loop Joint Transmission CoMP, 2015 IEEE 82nd Vehicular Technology Conference, Sep. 6, 2015, total 7 pages.

* cited by examiner

SYSTEMS AND METHODS FOR DISTRIBUTED OPEN-LOOP MULTI-USER CO-OPERATIVE MULTI-POINT (COMP) SCHEDULING AND TRANSMISSION

CROSS-REFERENCE TO RELATED APPLICATION

This application claims the benefit of U.S. Provisional Patent Application Ser. No. 62/316,914 filed on Apr. 1, 2016, the entire content of which is incorporated herein by reference.

FIELD OF THE APPLICATION

The application relates to wireless communication generally, and, in particular embodiments, to systems and methods for distributed open-loop multi-user co-operative multi-point (CoMP) scheduling and transmission.

BACKGROUND

To support high capacity demand and new applications in evolving networks such as fifth generation (5G) wireless networks, ultra-dense networks (UDN) and moving networks (MN) are being developed. Such network architectures are challenged by high capacity demand, inter-cell interference, frequent handovers, and fast moving users, among other challenges. Technologies, such as Coordinated multipoint (CoMP) or Joint transmission (JT) CoMP, Coordinated beam forming/scheduling (CB/CS) CoMP, and multi-user multiple-input and multiple-output (MU-MIMO) based on beam forming are being proposed to alleviate such challenges. However, such CoMP and MU-MIMO schemes are closed-loop schemes, requiring channel state information (CSI) feedback, which in turn requires signaling overhead. The CSI feedback is also sensitive to channel aging and feedback error. Sparse Code Multiple Access (SCMA) is a transmission scheme with relatively low complexity receiver design and good performance. SCMA can offer high spectral efficiency by supporting overloaded systems having more connected devices or traffic than orthogonal resources. A Multi-user SCMA (MU-SCMA) scheme can also increase throughput and coverage, and support open-loop (OL) user multiplexing with low feedback overhead and with less sensitivity to channel aging and feedback error.

However, there is still a need for more efficient CoMP systems.

SUMMARY

One aspect of the present disclosure provides a method in a network node. The network node schedules a first data transmission for a first user equipment (UE) in a first transmission tier. The first transmission tier is in a first time-frequency resource and has predefined modulation and coding. The network node also schedules a second data transmission for a second UE in a second transmission tier. The second transmission tier has adaptive modulation and coding that may be adapted based on channel quality indicator (CQI) feedback information, for example. The second transmission tier may be in a second time-frequency resource that at least partially overlaps the first time-frequency resource. The network node transmits the first data transmission in the first transmission tier according to the scheduling for the first UE and transmits the second data transmission in the second transmission tier according to the scheduling for the second UE.

In some embodiments, the network node may perform layer-based multiplexing. For example, the network node may schedule the first data transmission for the first UE in at least one layer of a plurality of layers multiplexed in the first transmission tier in at least one of: a time domain, a frequency domain, a code domain, a power domain, and a space domain. In some embodiments, each layer in the first transmission tier has a predefined modulation and coding scheme.

The network node may reconfigure the predefined modulation and coding in the first transmission tier and transmit modulation and coding information to the UEs identifying the reconfigured predefined modulation and coding.

The network node may adapt the modulation and coding in the second transmission tier based on the CQI feedback information from the UEs and information regarding transmission errors and/or re-transmissions.

The network node's transmissions in the first and second transmission tiers may utilize sparse code multiple access (SCMA) waveforms and/or orthogonal frequency division multiple access (OFDMA) waveforms. For example, in one embodiment, transmissions in the first transmission tier utilize SCMA waveforms and transmissions in the second transmission tier utilize OFDMA waveforms.

The network node may transmit scheduling information to the first UE identifying where data for the first UE will be transmitted within the first transmission tier.

In some embodiments, the network node transmits a reference signal. The network node may then receive, from each of the UEs, respective CQI feedback information indicating a measurement in accordance with the reference signal. The network node may then schedule data transmissions for the UEs based at least in part on their respective CQI feedback information. The reference signal may be a pilot signal sequence that is mapped to a predefined modulation and coding scheme that is being used by the network node in the first transmission tier, for example.

For each UE, the network node may schedule data transmission for the UE based on information regarding a number of layers in the first transmission tier that the UE was able to decode and/or information regarding signal-to-interference-plus-noise ratio (SINR) in the second transmission tier.

In some embodiments, the first transmission tier may include multiple zones of time-frequency resources, each zone having an associated set of first transmission tier transmission parameters. In such embodiments, the network node may schedule the first data transmission for the first UE in a zone and then transmit the first data transmission in the zone in accordance with the first transmission tier parameter set associated with the zone.

The associated set of first transmission tier transmission parameters may include parameters such as a predefined modulation and coding scheme used in the zone, a power sharing factor $\alpha_{zone}$ and/or a number of layers multiplexed in the zone. In some embodiments, the network node may be configured to adjust the size of a zone and/or one or more of the parameters in the first transmission tier parameter set associated with the zone based on UE feedback.

Another aspect of the present disclosure provides a network device configured to perform the method according to the above aspect of the present disclosure. For example, such a network device may include a wireless interface, a processor operatively coupled to the wireless interface, and a computer readable storage medium operatively coupled to the processor, the computer readable storage medium storing programming for execution by the processor that includes instructions to perform the method according to the above aspect of the present disclosure.

Yet another aspect of the present disclosure provides a method in a UE. The UE receives transmissions in at least one of a first transmission tier and a second transmission tier. The first transmission tier is in a first time-frequency resource and has predefined modulation and coding. The second transmission tier is in a second time-frequency resource that at least partially overlaps the first time-frequency resource. From the received transmissions, the UE jointly detects transmissions in the first transmission tier from at least one network node using the predefined modulation and coding of the at least one network node in the first transmission tier, treating transmissions in the second transmission tier as interference.

In some embodiments, the UE jointly detects transmissions using one or more joint reception techniques, such as successive interference cancellation (SIC), a message passing algorithm (MPA), maximum likelihood detection (MLD), Linear Minimum Mean Square Error (LMMSE), or combinations thereof.

In some cases, for each network node that has scheduled data transmission for the UE, the UE receives scheduling information from the network node regarding where data for the UE will be transmitted by the network node within one of the transmission tiers. The scheduling information may identify one or more layers in the first transmission tier that the network node has assigned to the UE, for example.

If data transmission for the UE is scheduled in the first transmission tier, the UE is configured to extract at least one transmission for the UE from among the transmissions that it jointly detected in the first transmission tier.

If data transmission for the UE is scheduled in the second transmission tier, the UE is configured to subtract the jointly detected transmissions in the first transmission tier from the received transmissions (e.g. using SIC) and detect a transmission for the UE in the second transmission tier from a remainder of the received transmissions remaining after the subtraction of the jointly detected transmissions in the first transmission tier.

In some embodiments, the UE provides feedback information to at least one network node regarding a number of layers in the first transmission tier that the UE was able to decode and/or a signal-to-interference-plus-noise ratio (SINR) in the second transmission tier.

Still another aspect of the present disclosure provides a UE configured to perform the method according to the above aspect of the present disclosure. For example, such a UE may include a wireless interface, a processor operatively coupled to the wireless interface, and a computer readable storage medium operatively coupled to the processor, the computer readable storage medium storing programming for execution by the processor that includes instructions to perform the method according to the above aspect of the present disclosure.

BRIEF DESCRIPTION OF THE DRAWINGS

Embodiments will now be described with reference to the attached drawings in which.

DETAILED DESCRIPTION OF EMBODIMENTS

For illustrative purposes, specific example embodiments will now be explained in greater detail below in conjunction with the figures.

The embodiments set forth herein represent information sufficient to practice the claimed subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Turning now to the figures, some specific example embodiments will be described.

Figure 1:
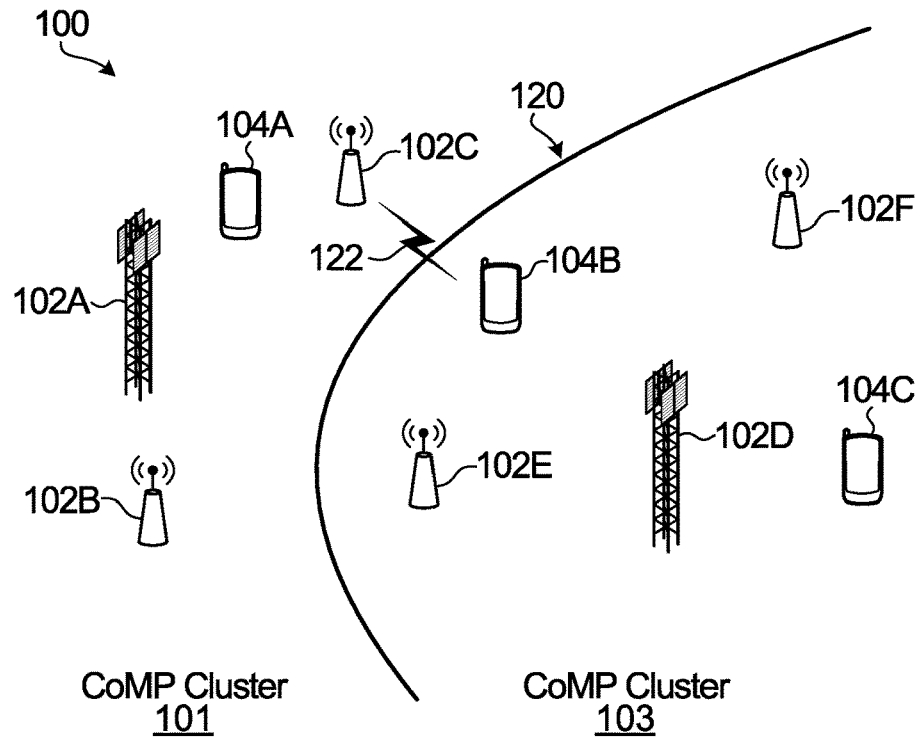
FIG. 1 is a block diagram illustrating a pre-planned CoMP clustering scheme in a communication network.

FIG. 1 is a block diagram illustrating pre-planned CoMP clustering scheme in a communication network 100. The portion of the communication network 100 shown in FIG. 1 is at a cluster-edge 120 between pre-planned CoMP clusters 101 and 103. The first pre-planned CoMP cluster 101 includes three network nodes 102A, 102B, 102C, which may also be referred to as transmission points or TPs. Network nodes 102A, 102B, 102C provide wireless communication service within CoMP cluster 101. The second pre-planned CoMP cluster 103 also includes three network nodes 102D, 102E, 102F that provide wireless communication service within CoMP cluster 103. Each network node 102 may be implemented using a radio transceiver, one or more antennas, and associated processing circuitry, such as antenna radio frequency (RF) circuitry, analog-to-digital/digital-to-analog converters, etc. However, the network nodes may be configured differently with different capabilities. For example, network nodes 102A and 102D may be evolved NodeBs (eNBs) and network nodes 102B, 102C, 102E and 102F may be picocells, femtocells, or the like.

User equipment (UE) 104A is located in the first CoMP cluster 101 and therefore may receive wireless communication service using one or more of the network nodes 102A, 102B, 102C in that cluster. UEs 104B, 104C are located in the second CoMP cluster 103 and therefore may receive wireless communication service using one or more of the network nodes 102D, 102E, 102F in that cluster. Each UE 104 includes a radio transceiver, one or more antennas, and associated processing circuitry, such as antenna radio frequency (RF) circuitry, analog-to-digital/digital-to-analog converters, etc. The network nodes 102 and the UEs 104 may include similar types of components to support communications with each other in the communication network 100, but the actual implementations may be different. For example, a UE is portable between locations, whereas a network node is typically intended to be installed at a fixed location.

Pre-planned CoMP cluster schemes such as the one illustrated in FIG. 1 were conceived in part to mitigate interference problems at cell-edges in cellular systems where a single transmission point provides coverage within a cell boundary. However, as shown in FIG. 1, this cell-edge interference problem still exists at the cluster-edge in pre-planned clustering schemes, where a UE near a cluster-edge may experience strong interference from a neighboring cluster. For example, as depicted in FIG. 1, UE 104B is located within the second CoMP cluster 103 near the cluster-edge 120, and may experience strong interference 122 from transmissions by one or more of the network nodes 102A, 102B, 102C in the first CoMP cluster 101.

Figure 2:
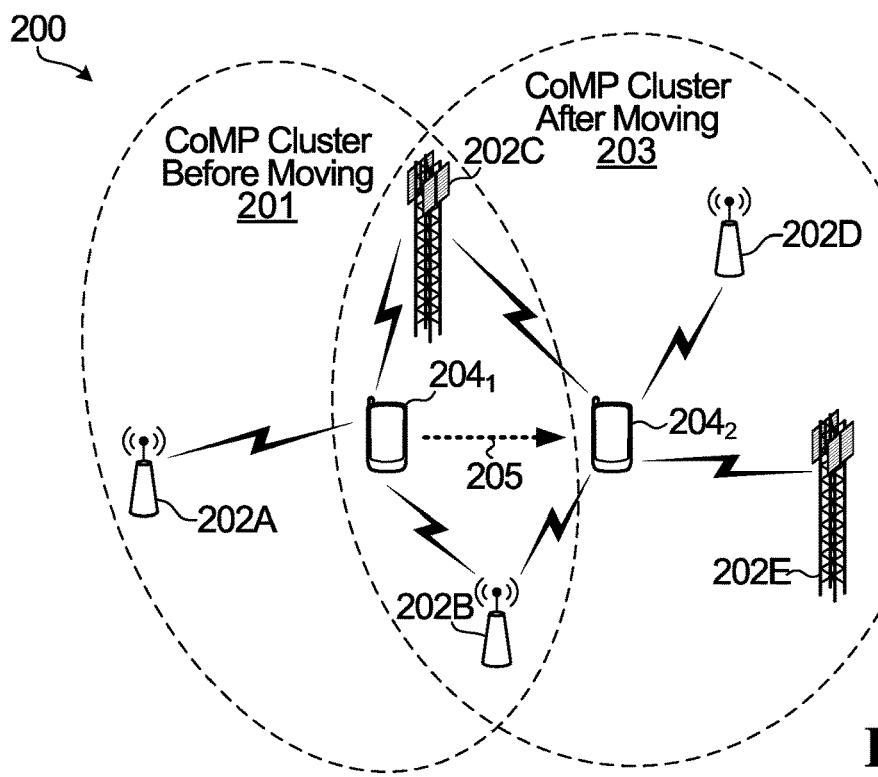
FIG. 2 is a block diagram illustrating a UE-centric CoMP clustering scheme in a communication network.

A UE-centric CoMP clustering scheme can potentially eliminate or at least mitigate the cluster-edge interference problem by dynamically selecting neighboring network nodes that can best serve a given UE. FIG. 2 is a block diagram illustrating a UE-centric CoMP clustering scheme in a communication network 200.

In FIG. 2, different locations of a UE 204 are shown at $204_1$ and $204_2$. The $204_1$ and $204_2$ labels are intended to denote the different locations of the same UE 204 rather than different UEs. Movement of the UE is shown at 205.

The UE 204 is exposed to multiple communication signals at each location $204_1$, $204_2$. At location $204_1$, for example, the UE 204 is exposed to communication signals from the network nodes 202A, 202B, 202C, and thus those nodes may be considered a potential network node CoMP cluster 201 to provide service to the UE 204.

As the UE 204 moves, the subset of network nodes that could potentially provide service to the UE could change. In Ultra Dense Networks (UDNs), network nodes that provide wireless communication service to UEs are located closer to each other than in less dense "macro" networks. A UE in a UDN may therefore transition between service areas of different network nodes when it is moved over a smaller distance relative to the distance for transitions between service areas in less dense networks. Service area transitions by UEs may also occur more often in UDNs. A UE may monitor a metric, such as a received power measurement from network nodes in its vicinity, to determine network nodes that could potentially be included in its serving set. When a UE moves and is under the coverage of a different set of network nodes, the network may proactively or reactively responds to that by assigning a new set of network nodes to the user. In the illustrated example, as the UE 204 moves from the location $204_1$ to the location $204_2$, as represented at 205, the subset of network nodes that could potentially provide service to the UE changes as the network node 202A is dropped from the potential serving set of network nodes and two new network nodes 202D, 202E are added to the potential serving set of network nodes. This change results in a new network node CoMP cluster 203 for the UE 204 at location $204_2$. The potential network node subset could be updated using one or more of uplink (UL) reciprocity, a tracking channel, user feedback, location services, etc. Movement of the UE 204 from the location $204_1$ to the location $204_2$ could be detected by a centralized processing system (not shown), for example, which could also inform the network nodes 202D and 202E that they are now part of the potential network node subset for the UE 204. The network node 202A could similarly be informed, by a centralized processing system or other component in the communication network 200, that it is no longer part of the subset that is providing service to the UE 204. In other implementations, movement of the UE 204 from the location $204_1$ to the location $204_2$ could be detected by the UE 204 itself, which could also inform the network nodes 202D and 202E that they are now part of the potential network node subset for the UE 204 and inform network node 202A that it is no longer part of the subset that is providing service to the UE 204.

In order to implement this UE-centric CoMP approach, open-loop, and distributed CoMP schemes with robustness to mobility are needed.

The present disclosure proposes a two-tier communication signaling approach to scheduling and transmission for distributed open-loop multi-user CoMP. A network node schedules UEs in one of two transmission tiers. The two transmission tiers include first and second transmission tiers in respective time-frequency resources that at least partially overlap. A predefined modulation and coding that is known to the UEs is used in the first transmission tier, whereas adaptive modulation and coding based on channel quality indicator (CQI) feedback information is used in the second transmission tier. The network node then transmits communication signaling to the UEs in the two transmission tiers according to the scheduling.

The scheduling and transmission can be done independently by each network node, or with some limited co-ordination between network nodes. This can potentially reduce the amount of backhaul communication between network nodes that is often required in conventional CoMP transmission schemes where channel state information (CSI) must be shared among co-operating network nodes serving a UE.

Embodiments of the present disclosure enable open-loop multi-user multiplexing with robustness to mobility and channel aging. UEs can be multiplexed in the power/code domain over the same time/frequency/space resources.

As a UE moves to a new location, the potential serving set of network nodes that could potentially cooperate in a network node cluster to serve a UE may be updated by the network based on the effective channel condition between network node transmit points and the UE as a transmitter (uplink channel condition) and/or receiver (downlink channel condition) at the new location. The location of the UE impacts the distance and hence path loss between the transmitters and receivers. Also, it may impact the effect of shadowing caused by the obstacles in the vicinity. In many cases, the potential serving set of network nodes is predominantly updated based on long term channel condition such as path loss and channel correlation, leaving short term variations to be considered by the scheduler/beamformer. On the network side, a network node may be configured to recognize those UE devices that have the network node included in their potential serving set, and treat those UEs as candidates for scheduling.

A UE can receive CoMP transmissions once the UE has transmissions scheduled by multiple network nodes. Joint detection techniques such as Successive Interference Cancellation (SIC), Message Passing Algorithm (MPA), Maximum Likelihood Detection (MLD), Linear Minimum Mean Square Error (LMMSE), or a combination of these techniques, allow a UE to jointly detect transmissions in the first transmission tier, which could be received from multiple network nodes, treating transmissions in the second transmission tier as interference. The term "jointly detect" is used herein to refer to receiving and decoding and/or mitigating interference in the information stream level, coded stream level or modulation symbol level. If a transmission has been scheduled for a UE in the first transmission tier, the UE uses the predefined modulation and coding in the first transmission tier of network nodes in its vicinity to try to detect the UE's scheduled transmission in the first transmission tier jointly with other transmissions not intended for the UE that may also be present in the first transmission tier. For example, the UE may use one or more of the joint detection techniques mentioned above to detect its scheduled transmission jointly with the other transmissions in the first transmission tier. If a transmission has been scheduled for the UE in the second transmission tier, then after having jointly detected transmissions in the first transmission tier, the UE subtracts the jointly detected transmissions from the received transmissions and detects its scheduled transmission from the remainder of the received transmissions.

The transmissions in the first transmission tier may be transmitted in multiple layers that are multiplexed in a time domain, a frequency domain, a code domain, a power domain, and/or a space domain. These transmission layers, also referred to as simply "layers" herein, could include respective data streams in an Orthogonal Frequency Division Multiplexing (OFDM) domain, a code domain using respective codebooks, and/or a spatial domain, for example. In a code domain, communication signals associated with different layers may be encoded using different predefined modulation and coding schemes. In one embodiment, incoming bits are mapped to sparse multi-dimensional complex codewords selected from predefined codebook sets in an approach that may also be known as Sparse Code Multiple Access (SCMA). Spatial domain layers could be layers in a Multiple Input Multiple Output (MIMO) system, for example.

Transmissions to multiple UEs in the first transmission tier can be supported by using a layer-based multiplexing in the first transmission tier, where each UE that has a transmission scheduled in the first transmission tier is allocated a respective set of one or more layers in the first transmission tier. Transmissions to multiple UEs in the second transmission tier can be supported using multiple access techniques, such as non-orthogonal multiple access or multi-user SCMA (MU-SCMA), for example. In some embodiments, first transmission tier and second transmission tier transmissions may partially collide, meaning that they may collide over some resources but not collide over other resources. For example, in one embodiment the second transmission tier is designed to cover all of the time-frequency resources in a spectrum band and the first tier is designed to cover only a subset of the time-frequency resources to provide service to the mobility and cell edge users. In another embodiment, where there is not enough traffic to justify the second tier occupying the entire spectrum band, the second transmission tier is designed to cover only a subset of the time-frequency resources, and the whole band can be assigned to the first transmission tier for better mobility handling.

Figure 3:
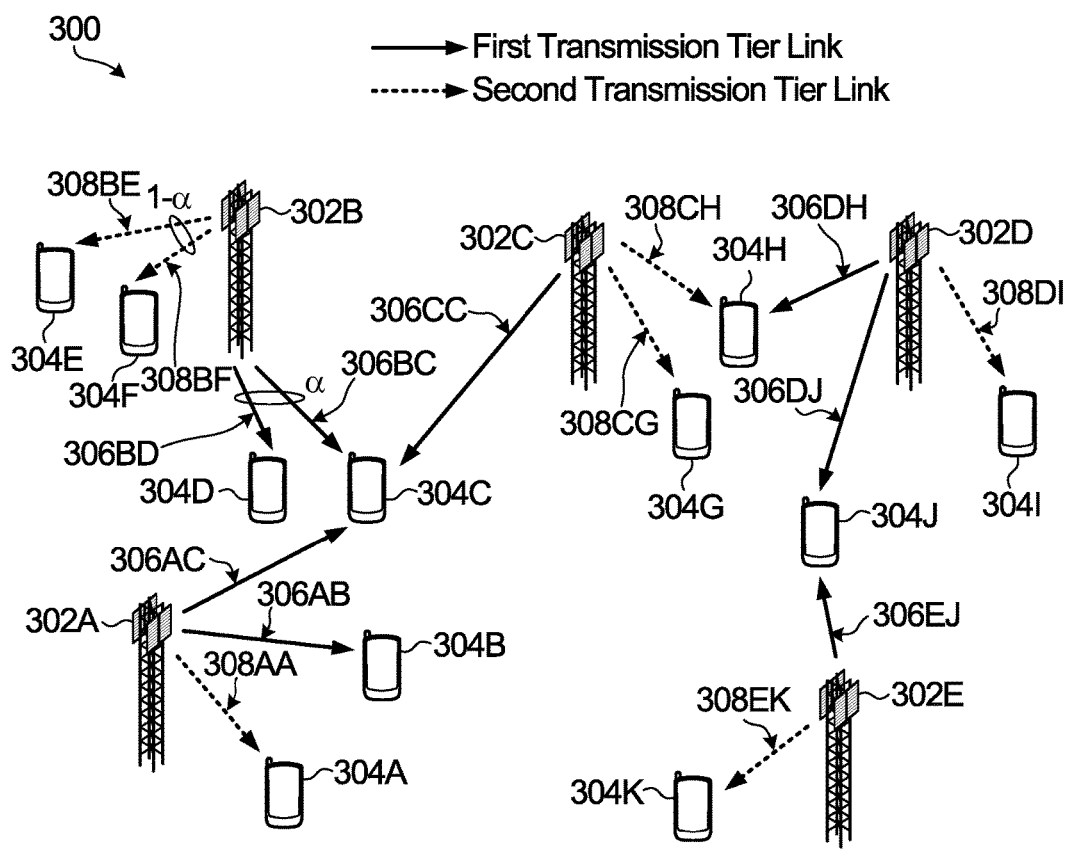
FIG. 3 is a block diagram illustrating a two-tier transmission scheme in a communication network according to example embodiments described herein.

FIG. 3 is a block diagram illustrating a two-tier transmission scheme in a communication network 300 according to example embodiments described herein.

The portion of the communication network 300 shown in FIG. 3 includes network nodes 302A, 302B, 302C, 302D, 302E and UEs 304A, 304B, 304C, 304D, 304E, 304F, 304G, 304H, 304I, 304J, 304K.

As depicted in FIG. 3, each of the UEs 304 has a transmission link to one or more of the network nodes 302 in at least one of two transmission tiers. The network node 302A has transmission links 306AB and 306AC in the first transmission tier with UEs 304B and 304C, respectively, and a transmission link 308AA in the second transmission tier with UE 304A. The network node 302B has transmission links 306BC and 306BD in the first transmission tier with UEs 304C and 304D, respectively, and transmission links 308BE and 308BF in the second transmission tier with UEs 304E and 304F, respectively. The network node 302C has a transmission link 306CC in the first transmission tier with UEs 304C and 304D, respectively, and transmission links 308BE and 308BF in the second transmission tier with UEs 304E and 304F, respectively. The network node 302D has transmission links 306DH and 306DJ in the first transmission tier with UEs 304H and 304J, respectively, and a transmission link 308DI in the second transmission tier with UE 304I. The network node 302E has a transmission link 306EJ in the first transmission tier with UE 304J and a transmission link 308EK in the second transmission tier with UE 304K. It should be noted that a UE may be scheduled for data transmission in different transmission tiers by different network nodes. UE 304H is scheduled for data transmission in the first transmission tier by network node 302D, as indicated by the first transmission tier transmission link 306DH, and in the second transmission tier by network node 302C, as indicated by the second transmission tier transmission link 308CH, for example.

The transmission links 306 in the first transmission tier use a predefined modulation and coding that is known to the UEs and is semi-static, but may be changed over a timeframe of several seconds or minutes. If the predefined modulation and coding in the first transmission tier is reconfigured, then information regarding the reconfiguration is transmitted to the UEs by the network. The predefined modulation and coding in the first transmission tier may differ from network node to network node. Network nodes 302A and 302E may use different predefined modulation and coding schemes in the first transmission tier, for example.

The transmission links 308 in the second transmission tier use adaptive modulation and coding based at least in part on CQI feedback information from the UEs. For example, the modulation and coding scheme used in the second transmission tier transmission link 308DI between the network node 302D and UE 304I may be adapted at network node 302D based at least in part on CQI feedback information received from UE 304I. In some embodiments, adaptive modulation and coding in the second transmission tier is adapted based on the CQI feedback information (e.g., signal-to-interference-plus-noise ratio (SINR) in the second transmission tier). In these embodiments, outer-loop link adaptation (OLLA) is enabled. For example, adaptive modulation and coding in the second transmission tier may be adapted based on the CQI feedback information and information regarding transmission errors (e.g., packet error rates) and/or re-transmissions (e.g., packet re-transmission rates). In some embodiments, closed loop link adaptation is used in the second transmission tier. For example, adaptive modulation and coding in the second transmission tier may be based on SINR and some mode of Channel State Information (CSI) knowledge that is reported by the UE to the network node transmission point and used for closed loop transmission.

In some embodiments, each network node 302 transmits a reference signal, such as a pilot signal sequence. The reference signal transmitted by a network node may be unique to the network node, or at least unique within a geographical area in which the network node is located. The UEs may report to the network node(s) CQI feedback information indicating a measurement in accordance with the reference signal(s) that they receive from the network node(s) in their vicinity. The network nodes may schedule transmissions for the UE in the two transmission tiers based on the CQI feedback information from the UE. In some embodiments, the scheduling within a transmission tier may be further based on a proportional fairness criterion.

In some embodiments, the CQI feedback information from a UE includes information regarding a number of layers in the first transmission tier that the UE was able to decode and/or information regarding SINR in the second transmission tier.

In some embodiments, pilot signal sequences are mapped to respective predefined modulation and coding schemes. In these embodiments, the reference signal transmitted by a network node is the pilot signal sequence corresponding to a predefined modulation and coding scheme that is being used by the network node in the first transmission tier. Based on this mapping and the pilot signal sequence(s) that a UE receives from the network node(s) in its vicinity, the UE can determine which predefined modulation and coding scheme(s) to use in the first transmission tier.

In some embodiments, predefined modulation and coding schemes in the first transmission tier are mapped to locations in the communication network. In some such embodiments, the location of a UE in the communication network is tracked. The current location of the UE is used in conjunction with the mapping between predefined modulation and coding schemes and network locations to determine predefined modulation and coding scheme(s) to use to detect communication signals in the first transmission tier. In some cases, this determination may be made by the UE itself. In other cases, the determination may be made on the network side, and information regarding the determined candidate modulation and coding scheme(s) may be transmitted to the UE.

A network node that has scheduled a UE for data transmission in one of the two transmission tiers may transmit scheduling information to the UE. This scheduling information may include information identifying where data for the UE will be transmitted within one of the two transmission tiers. For example, the network node may transmit information identifying the resources (e.g., time slots, frequency bands) within a transmission tier that have been allocated to the UE. In other embodiments, a UE may not be advised of where data for the UE will be transmitted within a transmission tier, and therefore a UE may have to blindly detect its data.

The waveforms of communication signals in the first and second transmission tiers are implementation specific. In one example embodiment, sparse code multiple access (SCMA) waveforms and/or orthogonal frequency division multiple access (OFDMA) waveforms may be utilized in one or both of the transmission tiers. In one specific example embodiment, transmissions in the first transmission tier utilize SCMA waveforms and transmissions in the second transmission tier utilize OFDMA waveforms.

As noted above, transmissions for UEs may be multiplexed in the first transmission tier using layer-based multiplexing. UE 304C, for example, may receive and apply layer-based decoding to the first transmission tier communications signals that it receives from network nodes 302A, 302B, 302C via first transmission tier transmission links 306AC, 306BC and 306CC, respectively. For example, The UE 304C may estimate the channel or communication signal that is associated with each of the different layers, and attempt to jointly decode the data associated with the UE in the first transmission tier. As noted above, layers in the first transmission tier may be multiplexed in one or more domains. For layers multiplexed in a code domain (e.g., SCMA layers), the UEs receive a set of codebooks with corresponding pilot patterns for the predefined modulation and coding scheme(s) that are used by the network nodes 302. For code domain layers, the UE 304C may use the layer codebooks to decode the received communication signals in the first transmission tier, treating received communication signals in the second transmission tier as interference, and may discard the communication signals associated with any layers in the first transmission tier that have not been allocated to it. In some embodiments, a network node that has scheduled a UE for data transmission in the first transmission tier transmits information to the UE regarding a number of layers, and indices of those layers, in the first transmission tier that are allocated to the UE.

The codebooks for different layers in the first transmission tier could be allocated and distributed to UEs by a centralized processing system (not shown) via signaling from one or more of the network nodes, for example. Multiple layers may share the same pilot sequence set and originate from the same physical/logical antenna port in some embodiments.

The network nodes 302 transmit data to the UEs 304 independently or with some limited coordination among network nodes. For example, where multiple network nodes schedule transmissions for a UE in the first transmission tier, each network node that has scheduled a transmission for the UE in the first transmission tier may transmit an independent data stream that is not shared with any other network node serving the UE. In other embodiments, each network node serving a UE may transmit data belonging to a shared data flow, where a portion of the shared data flow is transmitted by the network node and another portion of the shared data flow is transmitted by at least one other network node serving the UE. In still other embodiments, each network node serving a UE may transmit a fountain code stream from a common data flow shared among at least one other network node serving the UE. For example, in the illustrated embodiment, UE 304C has three serving network nodes 302A, 302B, 302C that have scheduled UE 304C for data transmission in the first transmission tier. Each of the network nodes 302A, 302B, 302C may transmit an independent data stream, a respective portion of a shared data flow, and/or a fountain code stream from a common data flow shared among at least one of the other network nodes serving the UE 304C.

Each of the network nodes 302 may have a total transmission power level that it shares between the two transmission tiers. The total transmission power level may be different for different network nodes. Different network nodes may share their respective total transmission power level between the two transmission tiers differently. In one embodiment, a network node shares its total transmission power level between the two transmission tiers according to a power sharing factor $\alpha$. In particular, the total transmission power level may be shared such that a ratio of a first transmission power level in the first transmission tier to the total transmission power level is given by $\alpha$ and a ratio of a second transmission power level in the second transmission tier to the total transmission power level is given by $1-\alpha$.

In many cases, the power sharing factor $\alpha$ is configured so that $\alpha \geq 0.5$, which means that more of the total transmission power level is allocated to the first transmission tier, which is more likely to serve cell-edge UEs, than to the second transmission tier, which is more likely to serve cell-center UEs. In some embodiments, the power sharing factor $\alpha$ is pre-configured and fixed, whereas in other embodiments $\alpha$ may be semi-static and reconfigurable, similar to the predefined modulation and coding in the first transmission tier. In either case, the value of the power sharing factor $\alpha$ may be selected from a pre-defined set of values.

In some embodiments, information regarding the power sharing factor $\alpha$ for a network node is transmitted to UEs. In other embodiments, a UE may blindly detect the power sharing factor $\alpha$ of the network node(s) in its vicinity.

In some embodiments, a UE may utilize its knowledge of $\alpha$ for channel estimation and/or interference estimation. With respect to channel estimation, in some cases a network node may be configured such that its demodulation reference signal (DMRS) ports or channel state information reference signal (CSI-RS) ports associated with the first and second transmission tiers are shared. In such cases, a UE that is aware of $\alpha$ for the network node may measure the channel for one port, then infer the channel for transmit layers of the first transmission tier by applying $\sqrt{\alpha}$ to the channel measurement and infer the channel for transmit layers of the second transmission tier by applying $\sqrt{1-\alpha}$ to the channel measurement. With respect to interference estimation, a UE may use the value for $\alpha$ to estimate the background interference to the first transmission tier caused by the second transmission tier by measuring the received power in the first transmission tier and deducing the interference based on the measured received power in the first transmission tier and the knowledge that the total transmission power level is shared between the two transmission tiers according to $\alpha$.

In some embodiments, the power sharing factor $\alpha$ of a network node may be determined based on a predefined modulation and coding scheme that the network node is configured to use in the first transmission tier, because both $\alpha$ and the modulation and coding scheme affect whether communication signals in the first transmission tier can be detected, treating communication signals in the second transmission tier as interference.

In some cases, the power sharing factor $\alpha$ for a network node may be configured so that a communication signal in the first transmission tier with a predefined modulation and coding scheme is likely to be decodable by at least a threshold portion of UEs in the vicinity of the network node. For example, the power sharing factor $\alpha$ for a network node or a group of network nodes may be based on a long-term SINR distribution of UEs in the vicinity of the network node(s). In one embodiment, given a certain threshold t, the value of the power sharing factor $\alpha$ is determined according to:

$$\alpha = \left(1 + \frac{1}{G(t)}\right)(1 - 2^{-SE_1}) \quad (1)$$

where $G(t)$ denotes the threshold compared to which t % of UEs have a long-term SINR higher than the threshold and $SE_1$ denotes the spectral efficiency of the first transmission tier communication signal. In some cases, the value for $\alpha$ determined according to equation (1) may be adjusted to increase or decrease the value for $\alpha$ in an effort to increase or decrease the likelihood that UEs are able to decode communication signals in the first transmission tier. Increasing the value for $\alpha$, thus increasing the transmission power level in the first transmission tier, increases the coverage area in which a network node could potentially serve UEs in the first transmission tier. Conversely, decreasing the value for $\alpha$ decreases a network node's coverage area for the first transmission tier. A network node may initially adjust the value for $\alpha$ to increase the likelihood that more UEs are able to be served by the network node in the first transmission tier. However, if the network node becomes heavily loaded in the first transmission tier, the network node may decrease the value for $\alpha$ in an effort to reduce the number of UEs that the network node serves in the first transmission tier. In some cases, the adjustment in $\alpha$ may be done in co-ordination with one or more neighboring network nodes for load-balancing purposes. For example, if a network node is heavily loaded in the first transmission tier and a neighboring network node is lightly loaded in the first transmission tier, the heavily loaded network node may decrease its value for $\alpha$ and the lightly loaded network node may increase its value for $\alpha$.

A UE having at least one scheduled transmission in at least one of the two transmission tiers receives transmissions in at least one of the two transmission tiers. From the received transmissions, the UE tries to jointly detect transmissions in the first transmission tier from network node(s) in its vicinity using the predefined modulation and coding of the network node(s) in the first transmission tier, treating transmissions in the second transmission tier as interference.

A UE scheduled for data transmission in the first transmission tier jointly detects transmissions for the UE from a set of at least one network node jointly with transmissions for other UEs from the set of at least one network node. The UE may select a transmit layer in the first transmission tier based on a received signal strength of a pilot pattern associated with the transmit layer.

As noted above, transmissions for UEs may be multiplexed in the first transmission tier using layer-based multiplexing. In such embodiments, a UE may receive, from each network node that has a transmission scheduled for the UE in the first transmission tier, information regarding at least one layer in the first transmission tier that the network node has allocated to the UE. The UE may then use this information to locate its data in the first transmission tier.

Transmissions in the first transmission tier may act as interference to transmissions in the second transmission tier. A UE that has a transmission scheduled in the second transmission tier may attempt to increase the likelihood of being able to detect its scheduled transmission in the second transmission tier by jointly detecting interfering transmissions in the first transmission tier, and subtracting the jointly detected transmissions in the first transmission tier from the received transmissions. The UE may jointly or successively attempt to detect its scheduled transmission in the second transmission tier from a remainder of the received transmissions remaining after the subtraction of the jointly detected transmissions in the first transmission tier.

In general, a UE attempts to jointly detect and subtract enough transmissions in the first transmission tier to be able to detect its scheduled transmission in the second transmission tier. In some embodiments, a UE may attempt to jointly detect and subtract as many transmissions in the first transmission tier as possible in order to maximize the likelihood of being able to detect it scheduled transmission in the second transmission tier. In some embodiments this may be an iterative process. For example, if the UE is unable to detect its scheduled transmission in the second transmission tier, the UE may attempt to jointly detect and subtract more transmissions in the first transmission tier in order to try to improve the SINR for its scheduled transmission in the second transmission tier. The UE may then again try to detect its scheduled transmission in the second transmission tier. For example, a UE that has a transmission scheduled in the second transmission tier may initially try to jointly detect transmissions in the first transmission tier that are associated with the same pilot pattern or the same network node that has a transmission scheduled for the UE in the second transmission tier. If the UE is unable to detect its scheduled transmission in the second transmission tier after having jointly detected and subtracted transmissions in the first transmission tier that are from the network node that has a transmission scheduled for the UE in the second transmission tier, then the UE may try to jointly detect transmissions in the first transmission tier that are associated with different pilot patterns or other network nodes in its vicinity. In some embodiments, subtracting the jointly detected transmissions in the first transmission tier from the received transmissions is done using successive interference cancellation.

In most cases, the more first transmission tier transmissions that a UE is able to detect and subtract, the greater the chance that the UE will be able to detect its data in the second transmission tier. Therefore, in some embodiments a UE that has a transmission scheduled in the second transmission tier is configured to try to jointly detect and subtract as many first transmission tier transmissions as possible in order to increase the SINR of its scheduled transmission in the second transmission tier. This may be advantageous from a throughput perspective because a UE that removes more interference from the first transmission tier may be able to detect a higher order MCS in the second transmission tier.

Throughput and coverage were simulated for example scenarios of CoMP transmission according to an embodiment of the two-tier communication signaling approach to scheduling and transmission for distributed open-loop multi-user CoMP disclosed herein. In this embodiment, a first transmission tier uses SCMA waveforms and a second transmission tier uses OFDMA waveforms. Other parameters of this embodiment that were used for simulation purposes are summarized below:

Two Tiers of Transmission
   First Transmission Tier: SCMA, fixed MCS, fixed number of SCMA layers, and pre-defined SCMA codebooks/signatures.
   Second Transmission Tier: OFDMA with variable MCS.
Power Sharing Between Two Tiers
   Power sharing between the two tiers is in accordance with a power sharing factor $\alpha$ as discussed previously.
Scheduling at TPs
   From a pool of UEs that have indicated that they are able to decode SCMA layers in the first transmission tier from a network node or transmit point (TP), the TP schedules transmissions to two UEs with proportional fairness (PF) criteria independently in the two transmission tiers. For example, one UE has a transmission scheduled in the second transmission tier using MCS adapted to CQI feedback, and OLLA enabled, and one UE has a transmission scheduled in the first transmission tier using fixed MCS and a fixed number of layers per link (i.e. fixed rate) with OLLA disabled. In this embodiment, the scheduling decision at each TP is independent of scheduling at other TPs. As a result, a UE can use CoMP as long as it is scheduled by multiple TPs.
Detection at UEs
   For a UE that has a transmission scheduled in the first transmission tier (SCMA tier):
      The UE uses joint/SIC detection to detect as many first transmission tier links (SCMA links) as the UE can using MPA (treating second transmission tier links (OFDMA links) as interference), even though some first transmission tier links are not allocated to the UE. The UE retains its own data in the detected first transmission tier links and discards the rest.
   For a UE that has a transmission scheduled in the second transmission tier (OFDMA tier):
      The UE first utilizes joint/SIC detection to detect as many first transmission tier links (SCMA links) as the UE can using MPA (treating second transmission tier links (OFDMA links) as interference). The UE then uses SIC to remove the detected first transmission tier links and detect its own data in the second transmission tier.

Table 1 below includes a summary of the simulated throughput and coverage for joint receivers and SIC receivers in simulation scenarios that include 1 to 3 joint TPs and different combinations of SCMA rate per link and power sharing factor $\alpha$.

TABLE 1

| Max. No. Joint TPs | SCMA Rate per Link, R, same for all TPs | SCMA Alpha (α) | Joint Receiver TPUT (Mbps) | Joint Receiver Cov. (kbps) | SIC Receiver TPUT (Mbps) | SIC Receiver Cov. (kbps) |
|---|---|---|---|---|---|---|
| 1 |  | 0 (OFDMA baseline) | 19.06 | 473.57 | 19.06 | 473.57 |
| 1 | 0.5789 | 0.8 | 19.13 | 577.45 | 19.13 | 577.45 |
| 2 | 0.5789 | 0.8 | 19.97 | 916.76 | 19.95 | 905.48 |
| 3 | 0.5789 | 0.8 | 20.92 | 1024.70 | 20.89 | 1006.30 |
| 2 | 0.5789 | 0.7 | 21.33 | 909.80 | 21.29 | 898.21 |
| 3 | 0.5789 | 0.7 | 21.74 | 1000.30 | 21.74 | 974.15 |
| 1 | 0.8118 | 0.8 | 21.35 | 535.58 | 21.35 | 535.58 |
| 2 | 0.8118 | 0.8 | 21.87 | 874.22 | 21.86 | 858.59 |
| 3 | 0.8118 | 0.8 | 22.47 | 968.55 | 22.45 | 959.29 |

Figure 4A:
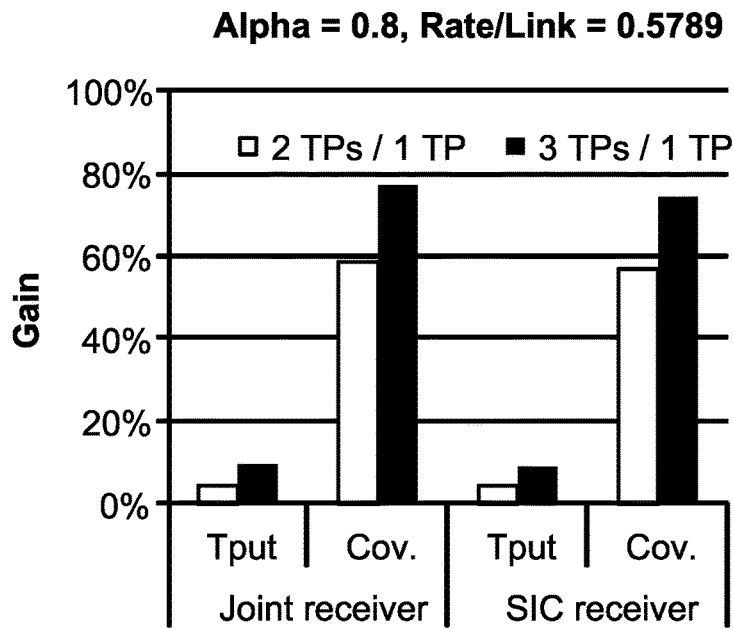
FIGS. 4A-4C illustrate simulated gains in throughput and coverage for example scenarios of CoMP transmission according to example embodiments described herein.
Figure 4B:
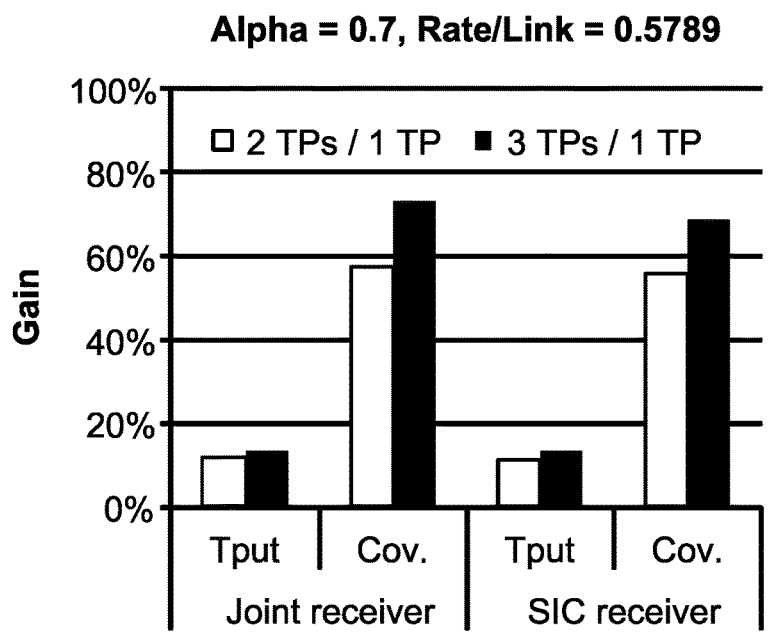
Figure 4C:
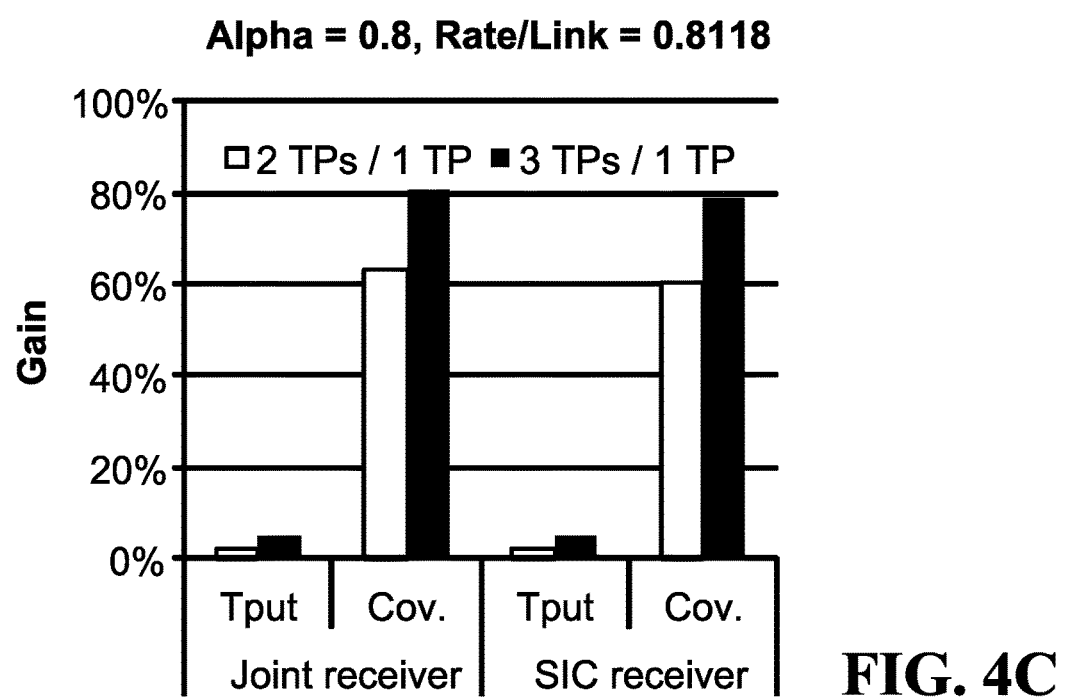

FIGS. 4A-4C illustrate the simulated gains in throughput and coverage for the example scenarios summarized in Table 1. As demonstrated by the simulation results, the distributed scheduling scheme of this embodiment provides coverage gain as the number of allowed joint TPs increases. The results also demonstrate that throughput and coverage can be adjusted based on the power sharing factor α and the SCMA rate per link.

FIGS. 4A-4C illustrate examples of the dependence of throughput and coverage on transmission power level and the modulation and coding scheme (reflected in the rate per link) used in the first transmission tier, for example. The number of layers used in the first transmission tier is another example of a transmission parameter that affects system performance. In general, transmitting in the first transmission tier with a lower transmission power level, a higher order MCS and/or more layers provides a higher throughput, but lower coverage. Conversely, transmitting in the first transmission tier with a higher transmission power level, a lower order MCS and/or fewer layers provides a lower throughput, but higher coverage. Using one set of parameters throughout the first transmission tier for transmitting to all UEs may be non-optimal. For example, if a single MCS is used in the first transmission tier and some UEs are able to decode a higher order MCS than the one currently being employed in the first transmission tier, then system performance may be improved if transmissions to such UEs could be made in the first transmission tier using the higher order MCS.

In some embodiments, a network node may use multiple sets of first transmission tier transmission parameters in multiple zones of time-frequency resources in the first transmission tier. This provides more flexibility in selecting first transmission tier transmission parameters to fit UEs conditions, thereby potentially improving overall system performance.

In some embodiments, the first transmission tier may be zoned according to a zone pattern. That is, two or more non-overlapping zones of time-frequency resources may be defined in the first transmission tier. The zones may be defined in terms of time resources, frequency resources or both time and frequency resources. The time-frequency resources for a zone may be a contiguous localized block of time-frequency resources and/or may include non-contiguous distributed blocks of time-frequency resources. Multiple sets of first transmission tier transmission parameters may be defined and associated with zones in the first transmission tier. The set of first transmission tier transmission parameters associated with a zone may include a predefined MCS that is to be used in a zone, a transmission power level that is to be used in a zone (e.g., expressed in terms of a zone-specific power sharing factor $\alpha_{zone}$) and/or a number of layers to be used in a zone, for example. In such embodiments, transmissions within a zone in the first transmission tier are made in accordance with the set of first transmission tier transmission parameters associated with the zone.

In some embodiments, time-frequency resources in the first transmission tier are divided in time, frequency, or time and frequency to define different zones in the first transmission tier. In most cases, zone boundaries are defined to respect a standard granularity, e.g. resource blocks (RBs), transmission time intervals (TTIs). Different zones can be different sizes in terms of time resources and/or frequency resources.

In some embodiments, zones are defined according to a certain rule, e.g. a time-frequency resource space may be divided into two zones, each with half the available bandwidth. The zone resources can be defined in logical resources, which can be mapped to physical resources, e.g. localized or contiguous time-frequency resources and/or distributed or non-contiguous time-frequency resources.

Figure 5A:
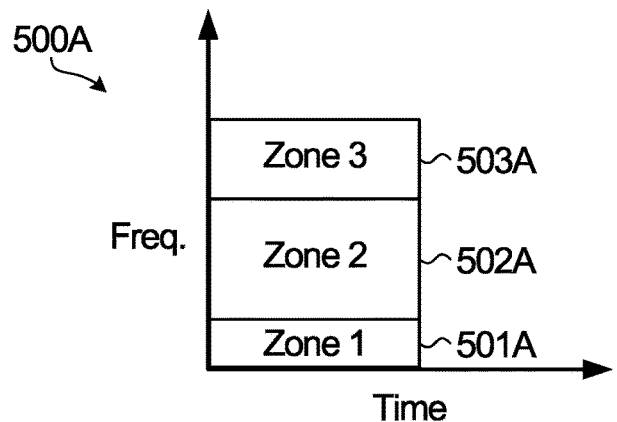
FIGS. 5A-5C illustrate examples of zone patterns in time-frequency resources where zones are defined in localized resources according to example embodiments described herein.
Figure 5B:
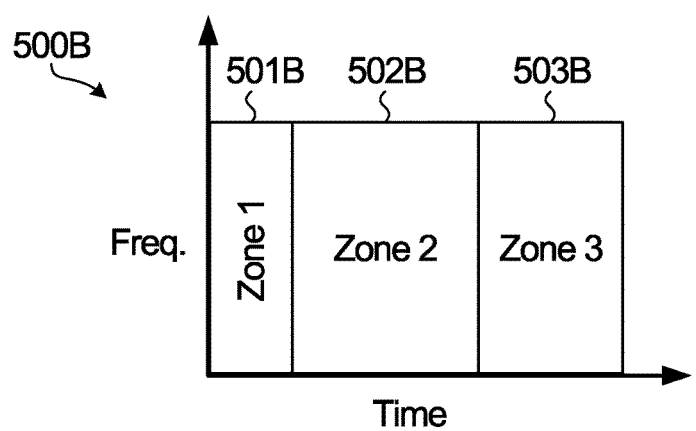
Figure 5C:
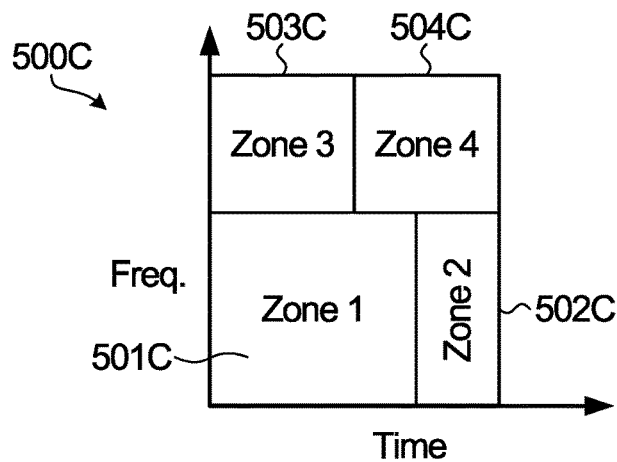

FIGS. 5A-5C illustrate examples of zone patterns in time-frequency resources in which zones are defined in localized time-frequency resources according to example embodiments described herein. FIG. 5A illustrates an example zone pattern 500A in which time-frequency resources are partitioned into three zones, namely Zone 1, Zone 2 and Zone 3, by frequency partitioning such that Zone 1 includes localized time-frequency resources 501A, Zone 2 includes localized time-frequency resources 502A, and Zone 3 includes localized time-frequency resources 503A. FIG. 5B illustrates an example zone pattern 500B in which time-frequency resources are partitioned into three zones, namely Zone 1, Zone 2 and Zone 3, by time partitioning such that Zone 1 includes localized time-frequency resources 501B, Zone 2 includes localized time-frequency resources 502B, and Zone 3 includes localized time-frequency resources 503B. FIG. 5C illustrates an example zone pattern 500C in which time-frequency resources are partitioned into four zones, namely Zone 1, Zone 2, Zone 3 and Zone 4, by time and frequency partitioning such that Zone 1 includes localized time-frequency resources 501C, Zone 2 includes localized time-frequency resources 502C, Zone 3 includes localized time-frequency resources 503C and Zone 4 includes localized time-frequency resources 504C.

Figure 6A:
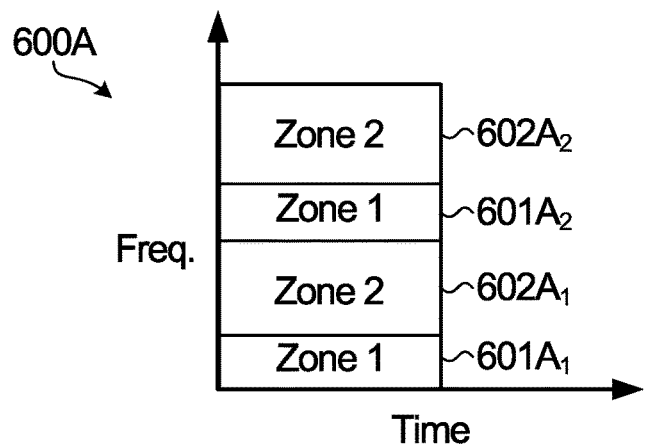
FIGS. 6A-6C illustrate examples of zone patterns in time-frequency resources where zones are defined in distributed resources according to example embodiments described herein.
Figure 6B:
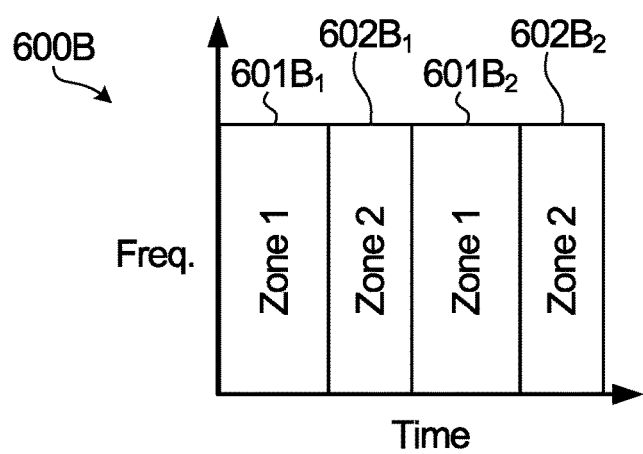
Figure 6C:
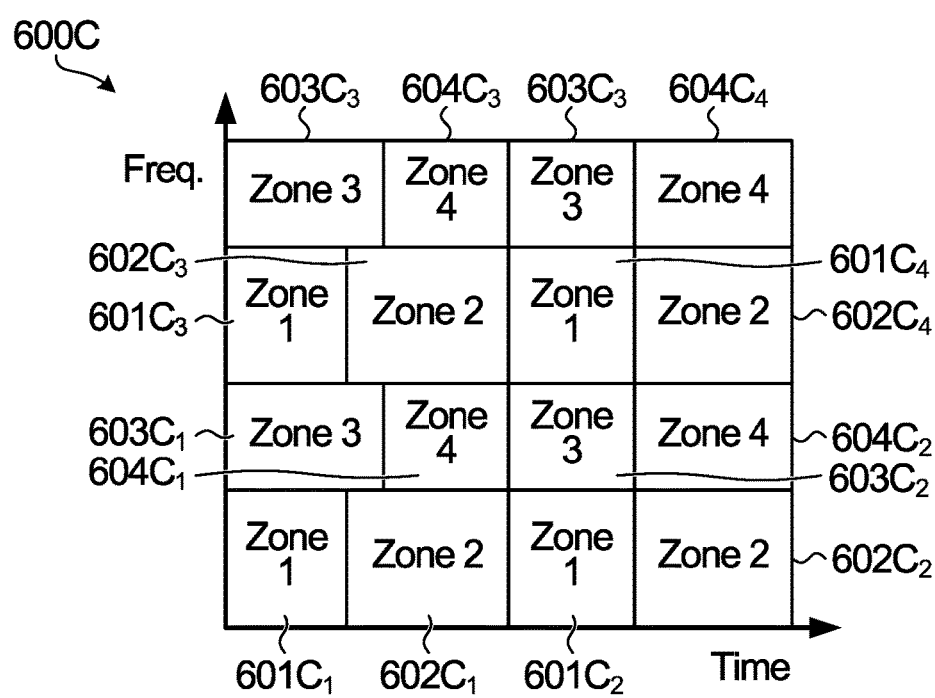

FIGS. 6A-6C illustrate examples of zone patterns in time-frequency resources in which zones are defined in distributed time-frequency resources according to example embodiments described herein. FIG. 6A illustrates an example zone pattern 600A in which time-frequency resources are partitioned into two zones, namely Zone 1 and Zone 2, by frequency partitioning such that Zone 1 includes distributed time-frequency resources $601A_1$ and $601A_2$, and Zone 2 includes distributed time-frequency resources $602A_1$ and $602A_2$. FIG. 6B illustrates an example zone pattern 600B in which time-frequency resources are partitioned into two zones, namely Zone 1 and Zone 2, by time partitioning such that Zone 1 includes distributed time-frequency resources $601B_1$ and $601B_2$, and Zone 2 includes distributed time-frequency resources $602B_1$ and $602B_2$. FIG. 6C illustrates an example zone pattern 600C in which time-frequency resources are partitioned into four zones, namely Zone 1, Zone 2, Zone 3 and Zone 4, by time and frequency partitioning such that Zone 1 includes distributed time-frequency resources $601C_1$, $601C_2$, $601C_3$ and $601C_4$, Zone 2 includes distributed time-frequency resources $602C_1$, $602C_2$, $602C_3$ and $602C_4$, Zone 3 includes distributed time-frequency resources $603C_1$, $603C_2$, $603C_3$ and $603C_4$ and Zone 4 includes distributed time-frequency resources $604C_1$, $604C_2$, $604C_3$ and $604C_4$.

In some embodiments, multiple sets of first transmission tier transmission parameters are defined. Each set of parameters may be associated with a pilot sequence. In such embodiments, a network node that is using a set of parameters transmits the pilot sequence that is associated with that set of parameters.

The number of sets of first transmission tier transmission parameters may be determined based on a criterion, such as the number of UE groups or the number of network node groups.

In some embodiments, UEs are grouped based on a criterion. For example, UEs may be grouped based on the size of the UE's potential serving set of network nodes, e.g., one group of UEs may include UEs having a potential serving set of size 2 and another group of UEs may include UEs having a potential serving set of size 3. In some embodiments, the number of sets of first transmission tier transmission parameters is based on the number of UE groups. For example, in some embodiments, the number of sets of first transmission tier transmission parameters is equal to the number of UE groups. In other embodiments, the number of sets of first transmission tier transmission parameters is equal to the number of UE groups that include at least a threshold number or percentage of UEs.

In some embodiments, network nodes are grouped based on a criterion, such as their network node or transmit point identification (TP ID). For example, in some embodiments, network nodes with the same mod(TP ID, # of TP groups) are grouped together, where TP ID is a network node's network node identification, # of TP groups is the total number of network node groups and mod( ) is the modulo function. In some embodiments, the number of sets of first transmission tier transmission parameters is equal to the number of network node groups.

A larger number of first transmission tier transmission parameter sets may provide more flexibility to serve the needs of different groups of UEs with different channel conditions, but may involve more signaling overhead. A smaller number of first transmission tier transmission parameter sets may be less flexible in terms of serving the needs of different groups of UEs with different channel conditions, but may provide most of the potential gains associated with zone in the first transmission tier, while having lower signaling overhead.

In each first transmission tier parameter set, parameters may be determined based on a criterion and/or objective. For example, the parameters may be selected based on an objective such as improving throughput, e.g. lower power sharing factor α and/or higher MCS, or improving coverage, e.g., higher power sharing factor α and/or lower MCS. In some embodiments, the parameters may be determined based on capacity-based calculations, statistics on joint decodability feedback, or some combination of the two, i.e. start by using capacity-based parameters, then revise the parameters when feedback becomes available. The capacity-based calculations may use Multiple Access Channel (MAC) capacity region equations and be based on long-term information, such as UE-to-TP path loss. The statistics on joint decodability feedback may be based on short-term fading information, for example.

Each zone in the first transmission tier corresponds to one set of first transmission tier transmission parameters. The association between zones and transmission parameter sets may be based on a criterion, such as a quality of service (QoS) requirement. For example, to satisfy a QoS requirement related to throughput, a larger zone in the first transmission tier may be associated with a parameter set that gives high throughput, e.g. lower power sharing factor α and/or higher MCS. To satisfy a QoS requirement related to coverage, a larger zone in the first transmission tier may be associated with a parameter set that gives high coverage, e.g., higher power sharing factor α and/or lower MCS. To satisfy a QoS requirement related to a delay constraint, a larger zone in the first transmission tier may be associated with a parameter set that gives low packet delay. In general, when a network node is less loaded the network node is able to provide a lower packet delay for UEs served by the network node than when the network node is more heavily loaded. In some embodiments, the association between zones and transmission parameter sets may be based on network information, such as UE grouping statistics. For example, if the percentage of UEs having a potential serving set of size 2 (Group A UEs) is larger than that of the percentage of UEs having a potential serving set of size 3 (Group B UEs), then a larger zone may be associated with a parameter set suited for Group A.

In some embodiments, the association of the zones and the first transmission tier transmission parameter sets is done semi-statically. In other embodiments, the association may be dynamic. Semi-static association requires less signaling overhead, and allows the parameters and/or zone pattern to be changed over a timeframe of several seconds or minutes. Dynamic association requires more signaling overhead, and allows the parameters and/or zone pattern to be changed more frequently to account for short term condition changes.

In some embodiments, the same zone pattern may be used by all network nodes. Different network nodes using the same zone pattern may use the same or different first transmission tier parameter sets in the same zone. The zone pattern may be static or may be changed semi-statically or dynamically. A semi-static assignment of the zone pattern requires lower signaling overhead relative to the dynamic assignment, but is less flexible to adapt to changes to an individual network node's operating conditions, such as changing traffic load.

In some embodiments, different network nodes may use different zone patterns. For example, in one embodiment each network node may adjust its zone pattern according to its own operational need. This means that a network node may have one or more zones that partially overlap one or more zones of another network node. The first transmission tier parameter sets used by network nodes for these overlapped zones can be the same or different. The zone pattern used by a network node may be static or may be changed semi-statically or dynamically. Using different zone patterns in different network nodes requires higher signaling overhead relative to using a common zone pattern.

In some embodiments, the same zone pattern is used by a group of network nodes, but different groups of network nodes can have different zone patterns.

In some embodiments, a network node's zone pattern and associated parameter sets can be adjusted based on a criterion, requirement or scenario and information such as UE feedback, prediction, or some (short/long-term) statistics. For example, the zone pattern and/or associated parameter sets may be adjusted based on decodability feedback for a given zone, e.g., if less than a threshold number of UEs can decode a number of first transmission tier links in a particular zone (a high interference scenario), then the MCS may be reduced in that zone. In another scenario, if a group of priority UEs requires high MCS (a high load scenario) and can decode it, then the MCS and zone size of a zone used to transmit to the group may be increased. When two conflicting requirements must both be considered, it may be possible to optimize the zone parameters/pattern based on the two conflicting requirements (e.g. high interference scenario vs. high load scenario), by assigning different pricing factors for the two conflicting requirements.

Zone patterns and associated parameter sets can be adjusted in a distributed or centralized manner. In the case of distributed adjustment, each network node adjusts its own zone pattern and the associated parameter sets independently. In the case of centralized adjustment, the zone adjustment between network nodes can be done in a centralized manner for only network nodes in a cluster or for network-wide network nodes. In some embodiments there may be negotiation exchanges between network nodes, e.g., network nodes may exchange their load requirement and/or interference information with each other.

In some embodiments, a zone pattern and/or associated parameter sets may be adjusted for load balancing purposes. For example, the zone pattern and/or associated parameter sets may be adjusted to adjust a network node's coverage area. By increasing the MCS of a zone for a network node, the coverage area of the network node can be reduced, because fewer UEs can decode data from the network node. The opposite is also true; by decreasing the MCS, the coverage area of the network node can be increased, because more UEs may be able to decode data from the network node. Hence, a network node with high load may off-load to neighboring network nodes by adjusting its zone pattern and/or associated parameter sets to reduce its coverage area. One or more of the neighboring network nodes that is only lightly loaded may adjust its zone pattern and/or associated parameter sets to increase its coverage area.

Signaling overhead associated with using zones in the first transmission tier includes signaling information regarding the multiple sets of first transmission tier transmission parameters, information regarding the zone patterns in time-frequency resources, information regarding the association of zones to sets of first transmission tier parameters, and information used in negotiation in zoning adjustment.

With respect to the information regarding the multiple sets of first transmission tier transmission parameters, a pool of parameter sets can be predefined and may be referred to by indices. New parameter sets can be added and broadcasted to UEs.

With respect to the information regarding the zone patterns in time-frequency resources, this information identifies zone boundaries/patterns, i.e. for localized and distributed RBs or RB groups. The zone patterns may be predefined. For example, the zone patterns may be based on a rule, e.g. there are two zones in a frequency band, with the default being either localized or distributed RB groups.

The information regarding the association of zones to sets of first transmission tier parameters may be explicitly transmitted to the UEs or may be implied if parameter sets and zone numbers are defined in order.

The information used in negotiation in zoning adjustment may include load and/or interference information for use in coordination/negotiation between network nodes, or at a centralized processing system to perform zone adjustment for multiple network nodes.

A UE does not need to know which zone belongs to which network node; the UE only needs to know the association of a zone pattern and associated first transmission tier transmission parameter sets with a pilot sequence.

Zone information, such as the zone patterns and associated first transmission tier transmission parameter sets, may be broadcasted to UEs. The zone information may be broadcast periodically or on an as-needed basis. For example, in some embodiments the zone information may be broadcast only if there is a change in parameters or zone pattern or zone association. The broadcast may only include updated parameter(s), e.g. if only the MCS is changed, then the broadcast may only identify the changed MCS, not all of the first transmission tier transmission parameters.

In some embodiments, if a new UE is entering the system, zone information may be unicast to the new UE. In other embodiments, the new UE has to wait for a periodic broadcast of the zone information.

As noted above, in some embodiments the number of zones and sets of associated first transmission tier transmission parameters may be determined based on the number of UE groups that result from grouping UEs according to some criterion or the number of network node groups that result from grouping network nodes according to some criterion.

Figure 7:
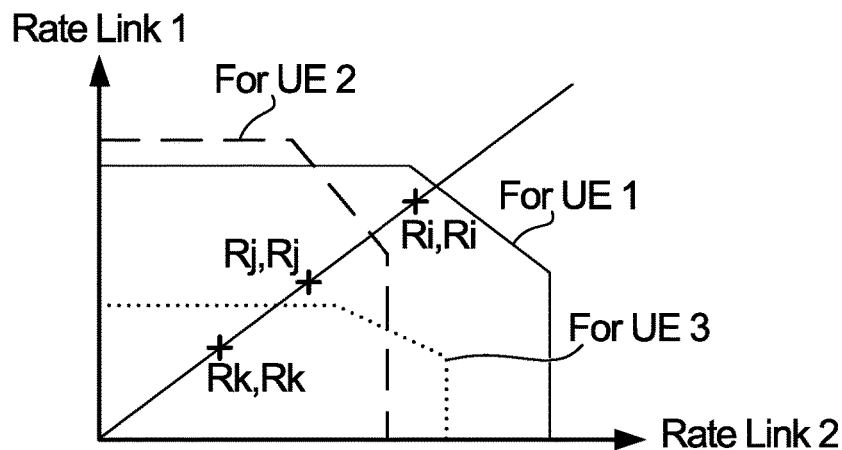
FIG. 7 illustrates multiple access capacity (MAC) regions for three user equipments (UEs) in a scenario in which different network nodes have the same first transmission tier throughput rate according to example embodiments described herein.

The UE grouping method for zoning and transmission parameter optimization is simple and applicable in scenarios where network nodes have the same zone pattern and provide first transmission tier links with the same MCS, thus providing the same spectral efficiency (SE) in bit per tone of an MCS FIG. 7 illustrates multiple access capacity (MAC) regions for three UEs in a scenario in which different network nodes have the same first transmission tier MCS or SE. The "Rate Link 1" axis of the plot depicted in FIG. 7 represents the possible SE achieved by an MCS transmitted by a first network node on a first layer in the first transmission tier. Similarly, the "Rate Link 2" axis represents the possible throughput rate transmitted by a second network node on a second layer in the first transmission tier. A UE may detect a layer only if the rate falls in its capacity region. As depicted in FIG. 7, different UEs may have different capacity regions. For example, if the rates for the first layer and the second layer are set at Rk (represented by the point Rk,Rk), then UE 1, UE 2 and UE 3 may be able to detect the first and second layers, because the point Rk,Rk falls within each of their capacity regions. If the rates for the first layer and the second layer are set at Rj, then only UE 1 and UE 2 may be able to detect the first and second layers, because the point Rj, Rj falls within the capacity regions of UE 1 and UE 2, but outside the capacity region of UE 3. Similarly, if the rates are set at Ri, then only UE 1 may be able to detect the first and second layers, because the point Ri,Ri falls only within the capacity region of UE 1. As depicted in FIG. 7, transmitting with lower rates in the first transmission tier may mean that more UEs are able to detect transmissions in the first transmission tier. However, it means the overall throughput is lower. In one embodiment of the UE grouping method, the number of zones for the zone pattern is determined based on the number of groups of UEs seeing different numbers of network nodes. The determination of how many network nodes a UE sees may be based on long-term path loss/received power at the UE, for example.

Table 2 below includes UE grouping results for an example scenario in which long-term received power at UEs is used to group UEs.

TABLE 2

| # TPs | % UEs seeing # TPs | Criteria for UE to see # TPs |
| --- | --- | --- |
| 5 | 1.70% | P1-P5 < 10 dB |
| 4 | 3.45% | P1-P4 < 10 dB and<br>P1-P5 > 10 dB |

TABLE 2-continued

| # TPs | % UEs seeing # TPs | Criteria for UE to see # TPs |
|---|---|---|
| 3 | 21.64% | P1-P3 < 10 dB and P1-P4 > 10 dB |
| 2 | 23.45% | P1-P2 < 10 dB and P1-P3 > 10 dB |

As indicated in the third column of Table 2, in this example the criterion for evaluating whether a UE sees a network node is whether the difference between the long-term received power from the network node is less than 10 dB lower than the long-term received power from the network node from which the UE receives the highest long-term received power (represented by P1). For example, a UE is considered to see four network nodes if the UE has four long-term received powers (represented by P1, P2, P3 and P4 when ranked in order of power) that are less than 10 dB lower than the UE's highest long-term received power P1. As indicated in Table 2, 3.45% of UEs in this example are found to satisfy this criterion, and thus are grouped into the UE group seeing four network nodes. It will be appreciated that the criteria indicated in the third column of Table 2 are merely illustrative examples and different criteria may be used in other embodiments.

In some cases, a threshold may be used to determine whether a group of UEs should have a zone associated with it. For example, a 20% threshold may be applied, whereby a group of UEs has a zone associated with it if the group includes at least 20% of the UEs. If such a threshold were applied to the UE groups in Table 2, then two zones would be defined for the two groups of UEs seeing two and three network nodes.

After the number of zones is obtained, the first transmission tier transmission parameters associated with each zone can be determined. The parameters may be determined based on capacity-based calculations, statistics on joint decodability feedback, or some combination of the two, as described above.

Figure 8:
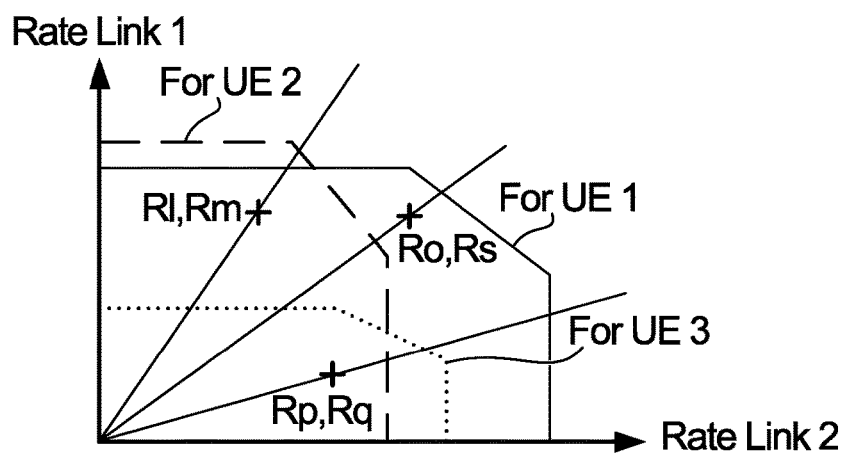
FIG. 8 illustrates MAC capacity regions for three UEs in a scenario in which different network nodes have different first transmission tier throughput rates according to example embodiments described herein.

The network node grouping method for zoning and first transmission tier transmission parameter optimization may be more applicable where rates for different first tier transmission links (i.e. first transmission tier transmission links from different network nodes) are different. FIG. 8 illustrates MAC capacity regions for three UEs in a scenario in which different network nodes have different first transmission tier throughput rates. The only difference between the scenario depicted in FIG. 7 and the scenario depicted in FIG. 8 is that in FIG. 7 all of the network nodes have the same rate, whereas in FIG. 8 not all the rates for all the network nodes are the same. As such, in different zones, some network nodes may send data with a higher rate than other network nodes, which may result in different decodability solutions for different UEs. In one embodiment of the network node grouping method, the number of zones for the zone pattern is determined based on the number of groups of network nodes.

Figure 9A:
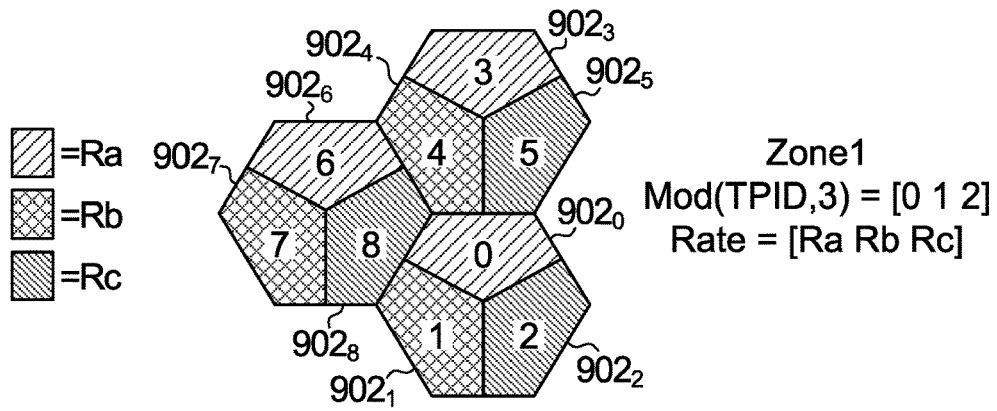
FIGS. 9A-9C illustrate an example of the grouping of network nodes and the allocation of different first transmission tier throughput rates to zones of time-frequency resources for each network node in a group according to example embodiments described herein.
Figure 9B:
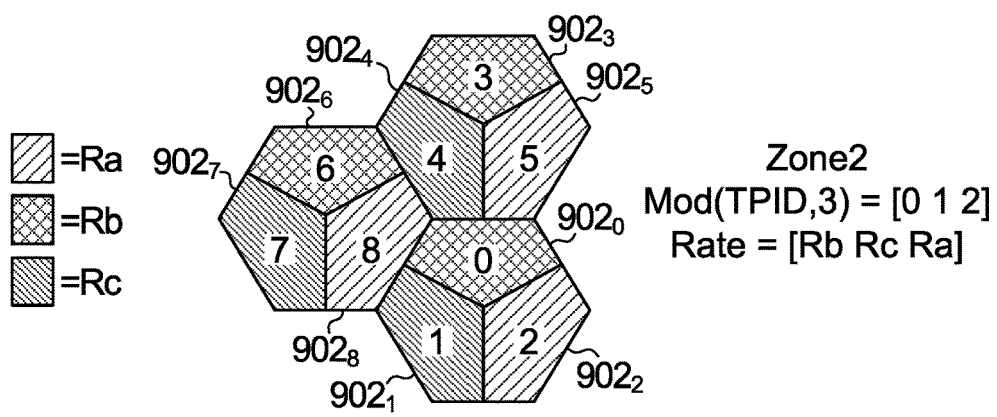
Figure 9C:
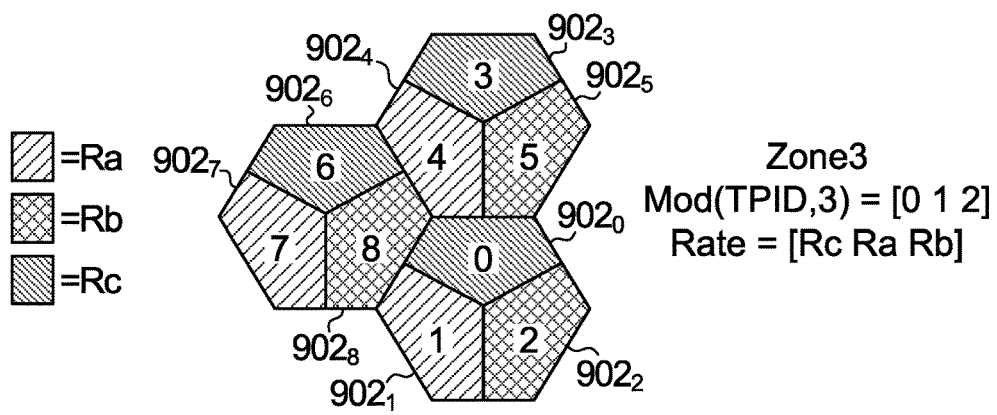

As discussed above, network nodes may be grouped based on a criterion, such as their TP ID. FIGS. 9A-9C illustrate an example of the grouping of nine network nodes $902_0$, $902_1$, $902_2$, $902_3$, $902_4$, $902_5$, $902_6$, $902_7$, and $902_8$ into three groups based on the TP IDs of the network nodes. In particular, in the illustrated example network nodes with the same mod(TP ID, # of TP groups) are grouped together. Network nodes $902_0$, $902_3$ and $902_6$ having TP IDs 0, 3 and 6, respectively, are grouped together; network nodes $902_1$, $902_4$ and $902_7$ having TP IDs 1, 4 and 7, respectively, are grouped together; and network nodes $902_2$, $902_5$ and $902_8$ having TP IDs 2, 5 and 8, respectively, are grouped together.

In the embodiment shown in FIGS. 9A-9C, the number of zones is equal to the number of network node groups, i.e. because there are three network node groups, there are three zones, namely Zone 1, Zone 2 and Zone 3.

FIGS. 9A, 9B and 9C indicate the rates provided by the network nodes 902 in each of the three zones, respectively. In particular, FIG. 9A indicates the rates provided by the network nodes 902 in Zone 1, FIG. 9B indicates the rates provided by the network nodes 902 in Zone 2, and FIG. 9C indicates the rates provided by the network nodes 902 in Zone 3.

To reduce signaling overhead, the first transmission tier transmission parameter sets associated with Zones 1, 2 and 3 for the three network node groups may be selected so that the rate vector for each zone, i.e. the vector of rates across the three network node groups for each zone, is a cyclic shifted version of the same set of rates=[Ra Rb Rc]. For example, as depicted in FIG. 9A, the rate vector for Zone 1 across the three network node groups is [Ra Rb Rc], the rate vector for Zone 2 across the three network node groups is [Rb Rc Ra] and the rate vector for Zone 3 across the three network node groups is [Rc Ra Rb]. As such, the network nodes $902_0$, $902_3$ and $902_6$, which are grouped in the network node group satisfying mod(TP ID, 3)=0, are configured so that three first transmission tier transmission parameter sets that provide rates Ra, Rb and Rc are respectively associated with Zone 1, Zone 2 and Zone 3. Similarly, the network nodes $902_1$, $902_4$ and $902_7$, which are grouped in the network node group satisfying mod(TP ID, 3)=1, are configured so that the three first transmission tier transmission parameter sets that provide rates Rb, Rc and Ra are respectively associated with Zone 1, Zone 2 and Zone 3. Finally, the network nodes $902_2$, $902_5$ and $902_8$, which are grouped in the network node group satisfying mod(TP ID, 3)=2, are configured so that three first transmission tier transmission parameter sets that provide rates Rc, Ra and Rb are respectively associated with Zone 1, Zone 2 and Zone 3.

Figure 10:
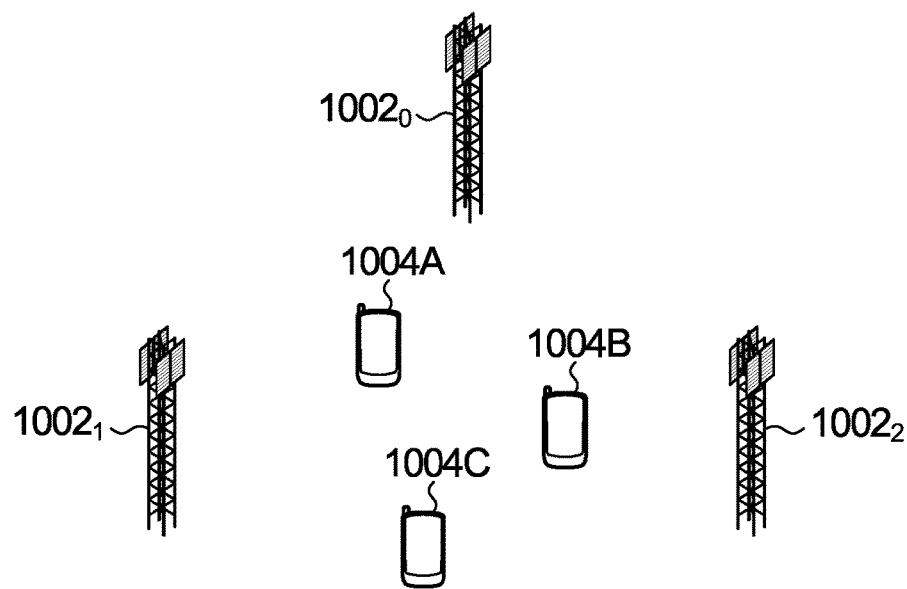
FIG. 10 is a block diagram illustrating a first transmission tier parameter optimization scheme in a communication network according to example embodiments described herein.

In some embodiments, the rate vector is optimized using MAC region equations. FIG. 10 is a block diagram illustrating a scenario in a communication network where such an optimization may be done for three network nodes $1002_0$, $1002_1$ and $1002_2$ to potentially provide service to three UEs 1004A, 1004B and 1004C. In the illustrated example, the network nodes $1002_0$, $1002_1$ and $1002_2$ are assigned TP IDs 0, 1 and 2, respectively, such that mod(TP ID, 3)=[0 1 2] for the three network nodes, i.e. each of the three network nodes is in a different network node group. If the first transmission tier transmission parameter sets for the three zones Zone 1, Zone 2 and Zone 3 are configured such that Ra>Rb>Rc, then data transmission for UE 1004A may be scheduled in Zone 1, because UE 1004A is closest, in order, to network nodes $1002_0$, $1002_1$ and $1002_2$, which are configured to provide rates Ra, Rb and Rc, respectively, in Zone 1. Similarly, data transmission for UE 1004B may be scheduled in Zone 2, because UE 1004B is closest, in order, to network nodes $1002_2$, $1002_0$ and $1002_1$, which are configured to provide rates Ra, Rb and Rc, respectively, in Zone 2.

Table 3 below includes a summary of simulated throughput and coverage for joint receivers and SIC receivers in simulation scenarios that include: CoMP transmission in one zone in the first transmission tier, CoMP transmission in two zones in the first transmission tier, and non-CoMP OFMDA transmission.

TABLE 3

| Max. No. Joint TPs | SCMA Rate per Link, R, same for all TPs | SCMA Alpha (α) | Joint Receiver TPUT (Mbps) | Joint Receiver Cov. (kbps) | Simplified SIC Receiver TPUT (Mbps) | Simplified SIC Receiver Cov. (kbps) |
|---|---|---|---|---|---|---|
| | | 0 (OFDMA baseline) | 18.65 | 514.84 | 18.65 | 514.84 |
| 3 | 0.6 | 0.8 | 20.70 | 976.11 | 20.57 | 967.22 |
| 3 | 0.8 | 0.8 | 21.95 | 895.00 | 21.88 | 822.50 |
| 3 | 1 | 0.8 | 22.46 | 157.50 | 22.31 | 144.23 |
| 3 | 0.6, 0.8 (2 zones) | 0.8 | 21.35 | 1048.00 | 21.25 | 1037.80 |
| 3 | 0.56, 1 (2 zones) | 0.8 | 22.25 | 1006.8 | 22.15 | 983.65 |

Table 4 below includes a summary of the simulated gains in throughput and coverage for a joint receiver receiving CoMP transmission in two zones in the first transmission tier relative to CoMP transmission in one zone in the first transmission tier and non-CoMP OFDMA transmission.

TABLE 4

| | Joint Receiver | | |
|---|---|---|---|
| Cases | TPUT gain | Cov. gain | Eqv. gain |
| 2 Zones (R = 0.6, 0.8)/ 1 Zone (R = 0.6) | 3.11% | 7.36% | 15.15% |
| 2 Zones (R = 0.6, 0.8)/ 1 Zone (R = 0.8) | −2.74% | 17.09% | 10.24% |
| 2 Zones (R = 0.56, 1)/ 1 Zone (R = 0.6) | 7.48% | 3.14% | 21.84% |
| 2 Zones (R = 0.56, 1)/ 1 Zone (R = 0.8) | 1.37% | 12.49% | 15.93% |
| 2 Zones (R = 0.6, 0.8)/ OFDMA | 14.50% | 103.56% | 139.82% |
| 2 Zones (R = 0.56, 1.0)/ OFDMA | 19.35% | 95.55% | 143.93% |

As indicated in Table 4, with a zone pattern that includes two zones in the first transmission tier, equivalent gains of more than 10% are observed compared to a configuration having only one zone. It is noted that the equivalent gain (Eqv. gain) given in the fourth column of Table 4 is a calculated metric that is determined according to:

$$\text{Eqv. gain} = \text{TPUT gain} \times 2.5 + \text{Cov. gain} \quad (2)$$

Figure 11:
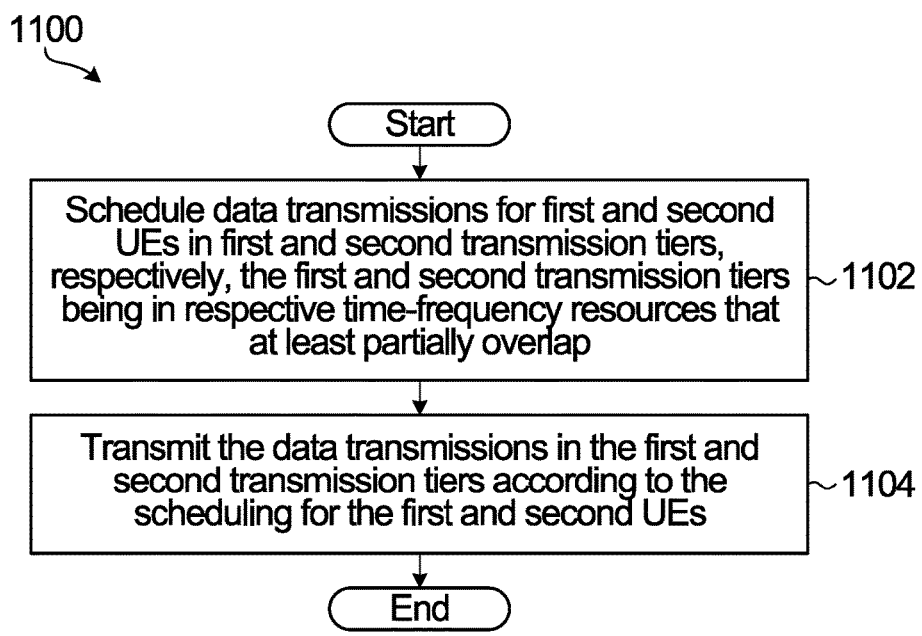
FIG. 11 illustrates a flow diagram of example operations in a network device according to example embodiments described herein.

FIG. 11 illustrates a flow diagram of example operations 1100 in a network device according to example embodiments described herein. Operations 1100 may be indicative of operations occurring in a network node such as an eNB, a picocell or the like.

Operations 1100 begin with scheduling a first data transmission for a first UE in a first transmission tier and scheduling a second data transmission for a second UE in a second transmission tier, the first and second transmission tiers being in respective time-frequency resources that at least partially overlap (block 1102). The UEs may be smartphones, sensors, personal computers, tablets or the like. As discussed previously, the first transmission tier may have predefined modulation and coding, and the second transmission tier may have adaptive modulation and coding adapted based on channel quality indicator (CQI) feedback information. The network node may transmit the first data transmission in the first transmission tier according to the scheduling for the first UE and transmit the second data transmission in the second transmission tier according to the scheduling for the second UE (block 1104).

The example operations 1100 are illustrative of an example embodiment. Various ways to perform the illustrated operations, as well as examples of other operations that may be performed, are described herein. Further variations may be or become apparent.

Figure 12:
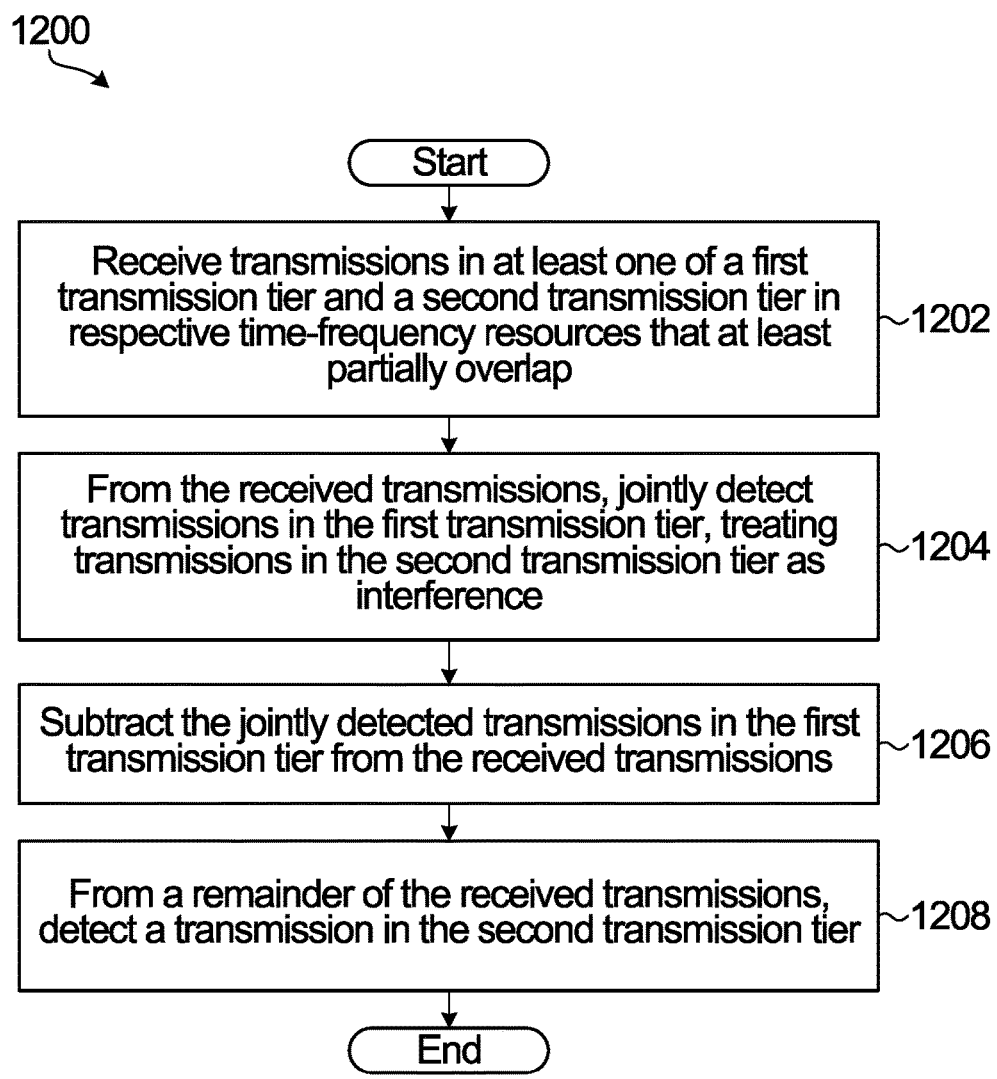
FIG. 12 illustrates a flow diagram of example operations in a user equipment (UE) according to example embodiments described herein.

FIG. 12 illustrates a flow diagram of example operations 1200 in a UE according to example embodiments described herein. Operations 1200 may be indicative of operations in a UE such as a smartphone, a sensor, a personal computer, a tablet or the like.

Data transmission is scheduled for the UE in a first transmission tier and/or a second transmission tier in respective time-frequency resources that at least partially overlap, as discussed previously. Operations 1200 begin with the UE receiving transmissions in at least one of the transmission tiers (block 1202). From the received transmissions, the UE jointly detects transmissions in the first transmission tier from at least one network node using the predefined modulation and coding of the at least one network node in the first transmission tier, treating transmissions in the second transmission tier as interference (block 1204).

If data transmission is scheduled for the UE in the first transmission tier by at least one network node, then the UE extracts its scheduled transmission from the detected transmissions in the first transmission tier and discards the other jointly detected transmissions in the first transmission tier.

If data transmission is scheduled for the UE in the second transmission tier, the operations 1200 then further include subtracting the jointly detected transmissions in the first transmission tier from the received transmissions (block 1206), for example using SIC. From a remainder of the received transmissions remaining after the subtraction of the jointly detected transmissions in the first transmission tier, the UE may then detect a transmission for the UE in the second transmission tier (block 1208).

The example operations 1200 are illustrative of an example embodiment. Various ways to perform the illustrated operations, as well as examples of other operations that may be performed, are described herein. Further variations may be or become apparent.

Figure 13:
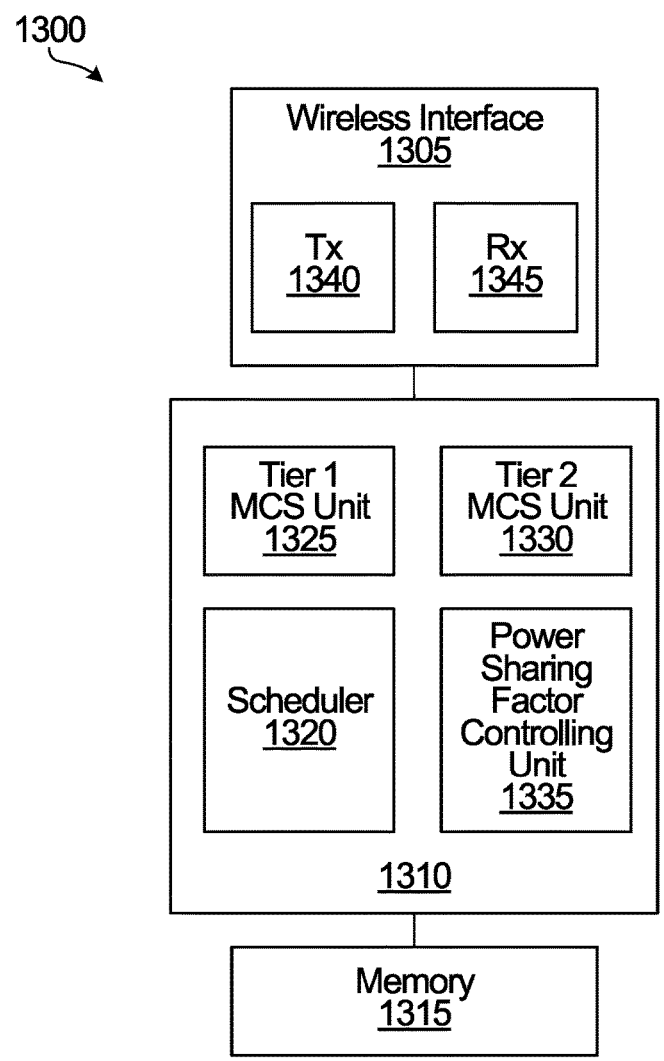
FIG. 13 illustrates a block diagram of an example network device according to example embodiments described herein.

FIG. 13 illustrates a block diagram of an example communication device 1300 according to example embodiments described herein. Communication device 1300 may be an implementation of a network device, such as an eNB, a picocell or the like. Communication device 1300 may be used to implement various ones of the embodiments discussed herein.

As shown in FIG. 13, communication device 1300 includes a wireless interface 1305. Wireless interface 1305 includes a transmitter 1330 configured to send messages, and a receiver 1335 configured to receive messages.

A scheduler 1320 is configured to schedule data transmissions for UEs in first and second transmission tiers in respective time-frequency resources that at least partially overlap, as discussed previously. The first transmission tier has predefined modulation and coding, and the second transmission tier has adaptive modulation and coding adapted based on channel quality indicator (CQI) feedback information.

A tier 1 MCS unit 1325 is configured to control the predefined modulation and coding that is applied to data for data transmissions that the scheduler 1320 schedules in the first transmission tier. Similarly, a tier 2 MCS unit 1330 is configured to control the adaptive modulation and coding that is applied to data for data transmissions that the scheduler 1320 schedules in the second transmission tier. For example, tier 2 MCS unit 1330 may be configured to control the adaptive modulation and coding based on CQI feedback information from the UEs for which data transmissions are scheduled in the second transmission tier.

The wireless interface 1305 is configured to transmit to each of the UEs for which data transmission has been scheduled according to the scheduling.

A power sharing factor controlling unit 1335 is configured to control how a total transmission power level for the network device 1300 is shared between the first and second transmission tiers. For example, the power sharing factor controlling unit 1335 may control a power sharing factor α, as discussed previously.

A memory 1315 is configured to store information regarding UEs in the vicinity of the network device, such as the number of first transmission tier layers a UE is capable of decoding, the SINR of second transmission tier signals at a UE, CQI feedback information from the UE, packet error rates and/or re-transmission rates for the UE, scheduling of data transmissions for the UE, and the like, as well as pre-defined modulation and coding scheme(s) for the first transmission tier and adaptive modulation and coding scheme(s) for the second transmission tier and their associated adaptation parameters, for example.

The elements of communication device 1300 may be implemented as specific hardware logic blocks. In an alternative embodiment, the elements of communication device 1300 may be implemented as software executing in a processor, controller, or application specific integrated circuit. In yet another alternative, the elements of communication device 1300 may be implemented as a combination of software and/or hardware.

As an example, transmitter 1330 and receiver 1335 may be implemented as a specific hardware block, and scheduler 1320, tier 1 MCS unit 1325, tier 2 MCS unit 1330 and power sharing factor controlling unit 1335 may be software modules executing in a processor 1310, such as a microprocessor, a digital signal processor, a custom circuit, or a custom compiled logic array of a field programmable logic array. Scheduler 1320, tier 1 MCS unit 1325, tier 2 MCS unit 1330 and power sharing factor controlling unit 1335 may be modules stored in memory 1315.

Figure 14:
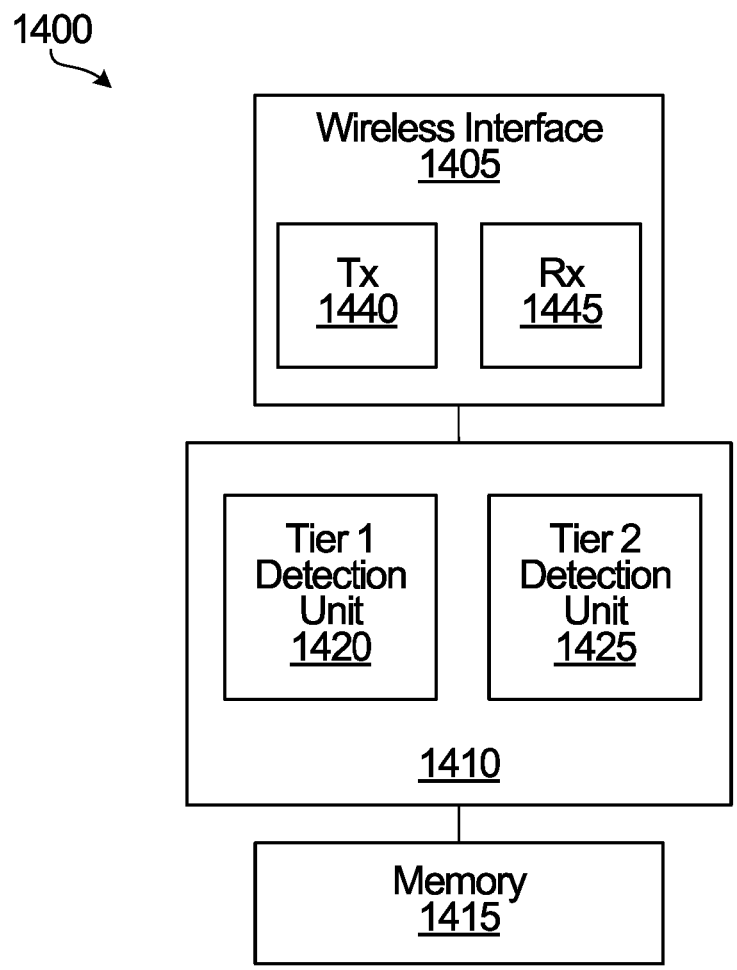
FIG. 14 illustrates a block diagram of an UE according to example embodiments described herein.

FIG. 14 illustrates a block diagram of an example communication device 1400 according to example embodiments described herein. Communication device 1400 may be an implementation of a UE, such as a smartphone, a sensor, a PC, a tablet or the like. Communication device 1400 may be used to implement various ones of the embodiments discussed herein.

As shown in FIG. 14, communication device 1400 includes a wireless interface 1405. Wireless interface 1405 includes a transmitter 1440 configured to send messages, and a receiver 1445 configured to receive messages. The wireless interface 1405 is configured to receive transmissions in at least one of the two transmission tiers, as discussed previously.

From the received transmissions, a tier 1 detection unit 1420 is configured to jointly detect transmissions in the first transmission tier using the predefined modulation and coding of the first transmission tier, treating transmissions in the second transmission tier as interference.

If the UE 1400 has a data transmission scheduled in the first transmission tier by at least one network node, then the tier 1 detection unit 1420 is further configured to extract its scheduled transmission from the detected transmissions in the first transmission tier and discard the other jointly detected transmissions in the first transmission tier.

If the UE 1400 has a data transmission scheduled in the second transmission tier, a tier 2 detection unit 1425 is configured to subtract, from the received transmissions, the transmissions in the first transmission tier that were jointly detected by the tier 1 detection unit 1420. For example, the tier 2 detection unit 1425 may be configured to use SIC to subtract the jointly detected transmissions in the first transmission tier. Once the jointly detected transmissions in the first transmission tier have been subtracted from the received transmissions, the tier 2 detection unit then detects, from a remainder of the received transmissions, a transmission for the UE 1400 in the second transmission tier.

In some embodiments, if the UE 1400 has a data transmission scheduled in the second transmission tier, the tier 1 detection unit 1420 is configured to jointly detect first transmission tier transmissions from at least the network node(s) that have scheduled data transmission for the UE in the second transmission tier.

In some embodiments, the first transmission tier includes several zones of time-frequency resources, as discussed above. In some such embodiments, if the UE 1400 has a data transmission scheduled in the second transmission tier, the tier 2 detection unit 1425 may be configured to subtract the jointly detected transmissions that are in zone(s) in the first transmission tier that overlap in time-frequency resources with the UE's scheduled data transmission in the second transmission tier.

A memory 1415 is configured to store information regarding the first and second transmission tiers, such as the predefined modulation and coding of the first transmission tier, the adaptive modulation and coding of the second transmission tier, a number of layers, and indices of those layers, that may be allocated to the UE 1400 in the first transmission tier, power sharing factors of network nodes in its vicinity, a potential serving set of network nodes in its vicinity, CQI feedback information such as the number of layers that the UE 1400 is able to decode in the first transmission tier and/or SINR of communication signals in the second transmission tier, and the like.

The elements of communication device 1400 may be implemented as specific hardware logic blocks. In an alternative embodiment, the elements of communication device 1400 may be implemented as software executing in a processor, controller, application specific integrated circuit. In yet another alternative, the elements of communication device 1400 may be implemented as a combination of software and/or hardware.

As an example, transmitter 1440 and receiver 1445 may be implemented as a specific hardware block, and tier 1 detection unit 1420 and tier 2 detection unit 1425 may be software modules executing in a processor 1410, such as a microprocessor, a digital signal processor, a custom circuit, or a custom compiled logic array of a field programmable logic array. Tier 1 detection unit 1420 and tier 2 detection unit 1425 may be modules stored in memory 1415.

Embodiments disclosed herein enable distributed and open-loop multi-user CoMP transmission, which can potentially improve the user experience at cell-edges by allowing more network nodes to simultaneously transmit to a UE. From the network perspective, embodiments of the two-tier scheduling and transmission approach disclosed herein can potentially be implemented with low scheduling complexity, because the scheduling can be done at each network node independently with low/no information sharing between network nodes. Embodiments also potentially allow easy and flexible mobility management and open-loop multi-user multiplexing to boost cell throughput with robustness to mobility and CSI feedback accuracy. Moreover, some embodiments allow UE-centric CoMP transmission, where each UE selects its own potential serving set of network nodes to potentially serve the UE.

Embodiments contemplated herein may be suitable to applications envisaged in the next generation 5G wireless network, including ultra-dense network (UDN) implementations, where UEs may experience many cell-edges and strong interference from network nodes/TPs in neighboring cells, as well as moving network (MN) and vehicle-to-vehicle (V2V) networks, where high mobility is a challenge. In particular, embodiments of the present disclosure provide flexible and easy mobility management and enable multi-user multiplexing with robustness to mobility and channel aging which are expected to be key requirements in 5G scenarios including UDN and MN/V2V with high speed users.

Numerous modifications and variations of the present application are possible in light of the above teachings. It is therefore to be understood that within the scope of the appended claims, the application may be practised otherwise than as specifically described herein.

In addition, although described primarily in the context of methods, apparatus and equipment, other implementations are also contemplated, such as in the form of instructions stored on a non-transitory computer-readable medium, for example.

We claim:

1. A method in a network node, the method comprising:
scheduling a first data transmission for a first user equipment (UE) in a first transmission tier, the first transmission tier being in a first time-frequency resource and having predefined modulation and coding without dynamic modulation and coding adaptation;
scheduling a second data transmission for a second UE in a second transmission tier, the second transmission tier having adaptive modulation and coding adapted based on channel quality indicator (CQI) feedback information, the second transmission tier being in a second time-frequency resource that at least partially overlaps the first time-frequency resource;
transmitting the first data transmission in the first transmission tier according to the scheduling for the first UE;
transmitting the second data transmission in the second transmission tier according to the scheduling for the second UE.

2. The method of claim 1, wherein scheduling the first data transmission for the first UE in the first transmission tier comprises scheduling the first data transmission for the first UE in at least one layer of a plurality of layers multiplexed in the first transmission tier in at least one of: a time domain, a frequency domain, a code domain, a power domain, and a space domain.

3. The method of claim 2, wherein each layer in the first transmission tier has a predefined modulation and coding scheme.

4. The method of claim 1, wherein transmissions in the first transmission tier utilize at least one of: sparse code multiple access (SCMA) waveforms and orthogonal frequency division multiple access (OFDMA) waveforms.

5. The method of claim 1, wherein transmissions in the second transmission tier utilize at least one of: sparse code multiple access (SCMA) waveforms and orthogonal frequency division multiple access (OFDMA) waveforms.

6. The method of claim 1, further comprising:
transmitting a reference signal; and
receiving, for each of the first UE and the second UE, respective CQI feedback information indicating a measurement in accordance with the reference signal,
wherein, for each of the first UE and the second UE, scheduling data transmission for the UE is based on the respective CQI feedback information from the UE.

7. The method of claim 6, wherein transmitting a reference signal comprises transmitting a pilot signal sequence that is mapped to a predefined modulation and coding scheme that is being used by the network node in the first transmission tier.

8. The method of claim 1, wherein, for each of the first UE and the second UE, scheduling data transmission for the UE is based on at least one of:
i) information regarding a number of layers in the first transmission tier that the UE was able to decode; and
ii) information regarding signal-to-interference-plus-noise ratio (SINR) in the second transmission tier.

9. The method of claim 1, wherein:
the first transmission tier comprises a plurality of zones of time-frequency resources, each zone having an associated set of first transmission tier transmission parameters;
scheduling the first data transmission for the first UE in the first transmission tier comprises scheduling the first data transmission for the first UE in a zone of the plurality of zones; and
transmitting the first data transmission in the first transmission tier comprises transmitting the first data transmission in the zone in accordance with the first transmission tier parameter set associated with the zone.

10. The method of claim 9, wherein, for each zone, the associated set of first transmission tier transmission parameters comprises at least one of:
a predefined modulation and coding scheme used in the zone;
a power sharing factor $\alpha_{zone}$, where a ratio of a first transmission power level in the zone in the first transmission tier to a total transmission power level in the zone is given by $\alpha_{zone}$ and a ratio of a second transmission power level in the zone in the second transmission tier to the total transmission power level in the zone is given by $1-\alpha_{zone}$; and
a number of layers multiplexed in the zone in at least one of: a time domain, a frequency domain, a code domain, a power domain, and a space domain.

11. A network device comprising:
a wireless interface;
a processor operatively coupled to the wireless interface; and
a non-transitory computer readable storage medium operatively coupled to the processor, the computer readable storage medium storing programming for execution by the processor, the programming comprising instructions to:
schedule a first data transmission for a first user equipment (UE) in a first transmission tier, the first transmission tier being in a first time-frequency resource and having predefined modulation and coding without dynamic modulation and coding adaptation;
schedule a second data transmission for a second UE in a second transmission tier, the second transmission tier having adaptive modulation and coding adapted based on channel quality indicator (CQI) feedback information, the second transmission tiers being in a second time-frequency resource that at least partially overlaps the first time-frequency resource;

transmit, via the wireless interface, the first data transmission in the first transmission tier according to the scheduling for the first UE;

transmit, via the wireless interface, the second data transmission in the second transmission tier according to the scheduling for the second UE.

12. The network device of claim 11, wherein the instructions to schedule the first data transmission for the first UE in the first transmission tier comprise instructions to schedule the first data transmission for the first UE in at least one layer of a plurality of layers multiplexed in the first transmission tier in at least one of: a time domain, a frequency domain, a code domain, a power domain, and a space domain.

13. The network device of claim 12, wherein each layer of the first transmission tier has a predefined modulation and coding scheme.

14. The network device of claim 11, wherein the wireless interface is configured to transmit in the first transmission tier with sparse code multiple access (SCMA) waveforms and transmit in the second transmission tier with orthogonal frequency division multiple access (OFDMA) waveforms.

15. The network device of claim 11, wherein, for each of the first UE and the second UE, the instructions to schedule data transmission for the UE comprise instructions to schedule data transmission for the UE based on at least one of:
    i) information regarding a number of layers in the first transmission tier that the UE was able to decode; and
    ii) information regarding signal-to-interference-plus-noise ratio (SINR) in the second transmission tier.

16. The network device of claim 11, wherein:
    the first transmission tier comprises a plurality of zones of time-frequency resources, each zone having an associated set of first transmission tier transmission parameters;
    the instructions to schedule the first data transmission for the first UE in the first transmission tier comprises instructions to schedule the first data transmission for the first UE in a zone of the plurality of zones; and
    the instructions to transmit, via the wireless interface, the first data transmission in the first transmission tier comprise instructions to transmit, via the wireless interface, the first data transmission in the zone in accordance with the first transmission tier parameter set associated with the zone.

17. A method in a user equipment (UE), the method comprising:
    receiving transmissions in at least one of a first transmission tier and a second transmission tier, the first transmission tier being in a first time-frequency resource and having predefined modulation and coding without dynamic modulation and coding adaptation, and the second transmission tier being in a second time-frequency resource that at least partially overlaps the first time-frequency resource, the second transmission tier having adaptive modulation and coding;
    from the received transmissions, jointly detecting transmissions in the first transmission tier from at least one network node using the predefined modulation and coding of the at least one network node in the first transmission tier, treating transmissions in the second transmission tier as interference.

18. The method of claim 17, wherein, where data transmission for the UE is scheduled in the first transmission tier, the method further comprises extracting from the jointly detected transmissions in the first transmission tier at least one transmission for the UE.

19. The method of claim 17, wherein, where data transmission for the UE is scheduled in the second transmission tier, the method further comprises:
    subtracting, from the received transmissions, the jointly detected transmissions in the first transmission tier; and
    from a remainder of the received transmissions remaining after the subtraction of the jointly detected transmissions in the first transmission tier, detecting a transmission for the UE in the second transmission tier.

20. The method of claim 19, wherein jointly detecting transmissions in the first transmission tier from at least one network node comprises jointly detecting transmissions in the first transmission tier from at least a network node that has scheduled a transmission for the UE in the second transmission tier.

21. The method of claim 17, further comprising reporting information to at least one network node regarding at least one of:
    i) a number of layers in the first transmission tier that the UE was able to decode; and
    ii) signal-to-interference-plus-noise ratio (SINR) in the second transmission tier.

22. A user equipment (UE) comprising:
    a wireless interface;
    a processor operatively coupled to the wireless interface; and
    a computer readable storage medium operatively coupled to the processor, the computer readable storage medium storing programming for execution by the processor, the programming comprising instructions to:
    receive, via the wireless interface, transmissions in at least one of a first transmission tier and a second transmission tier, the first transmission tier being in a first time-frequency resource and having predefined modulation and coding without dynamic modulation and coding adaptation, and the second transmission tier being in a second time-frequency resource that at least partially overlaps the first time-frequency resource, the second transmission tier having adaptive modulation and coding;
    from the received transmissions, jointly detect transmissions in the first transmission tier from at least one network node using the predefined modulation and coding of the at least one network node in the first transmission tier, treating transmissions in the second transmission tier as interference.

23. The UE of claim 22, wherein, where data transmission is scheduled for the UE in the first transmission tier by at least one network node, the programming further comprises instructions to extract from the jointly detected transmissions in the first transmission tier at least one transmission for the UE.

24. The UE of claim 22, wherein, where data transmission for the UE is scheduled in the second transmission tier, the programming further comprises instructions to:
    subtract, from the received transmissions, the jointly detected transmissions in the first transmission tier; and
    from a remainder of the received transmissions remaining after the subtraction of the jointly detected transmission in the first transmission tier, detect a transmission for the UE in the second transmission tier.

25. The UE of claim 22, wherein the programming further comprises instructions to report information to at least one network node regarding at least one of:

i) a number of layers in the first transmission tier that the UE was able to decode; and
ii) signal-to-interference-plus-noise ratio (SINR) in the second transmission tier.

* * * * *